US006621046B2

(12) United States Patent
Kaji

(10) Patent No.: US 6,621,046 B2
(45) Date of Patent: Sep. 16, 2003

(54) METHOD OF MANUFACTURING PREPREG

(75) Inventor: Yoshiyuki Kaji, Kooriyamashi (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 10/108,481

(22) Filed: Mar. 29, 2002

(65) Prior Publication Data

US 2003/0116545 A1 Jun. 26, 2003

(30) Foreign Application Priority Data

Dec. 25, 2001 (JP) ........................ 2001-392113

(51) Int. Cl.⁷ ............................................. B23K 26/00
(52) U.S. Cl. ............................ 219/121.72; 219/121.67; 219/121.85
(58) Field of Search ................. 219/121.72, 121.67, 219/121.85, 121.6; 156/250, 267, 272.2

(56) References Cited

U.S. PATENT DOCUMENTS

| | | | | |
|---|---|---|---|---|
| 4,639,572 A | * | 1/1987 | Gruzman et al. | 219/121 LG |
| 5,808,274 A | * | 9/1998 | Lee | 219/121.72 |
| 6,294,757 B1 | * | 9/2001 | Whittenbury | 219/121.72 |

FOREIGN PATENT DOCUMENTS

| | | |
|---|---|---|
| JP | 03094988 | 4/1991 |
| JP | 05235503 | 9/1993 |
| JP | 05235504 | 9/1993 |
| JP | 01138288 | 5/2001 |

OTHER PUBLICATIONS

English Language Abstract for JP Appl. No. 05–235504.
English Language Abstract for JP Appl. No. 05–235503.
English Language Abstract for JP Appl. No. 2001-138288.
English Language Abstract for JP Appl. No. 03–094988.

* cited by examiner

Primary Examiner—M. Alexandra Elve
(74) Attorney, Agent, or Firm—Greenblum & Bernstein, P.L.C.

(57) ABSTRACT

A prepreg cutting method is provided that cuts prepreg without applying any processing, such as heating, to that part of prepreg other than the place to be cut. When prepreg formed by impregnating a base material with a resin and left to semi-harden is to be cut into a specified dimension, the surface of the prepreg is irradiated with a laser beam so that the resin of the irradiated portion is softened while the laser beam irradiating position is shifted on the prepreg, and the softened resin part is cut by a cutting blade. Because the cutting blade cuts the prepreg portion where the resin has softened, resin dust will not scatter.

25 Claims, 15 Drawing Sheets

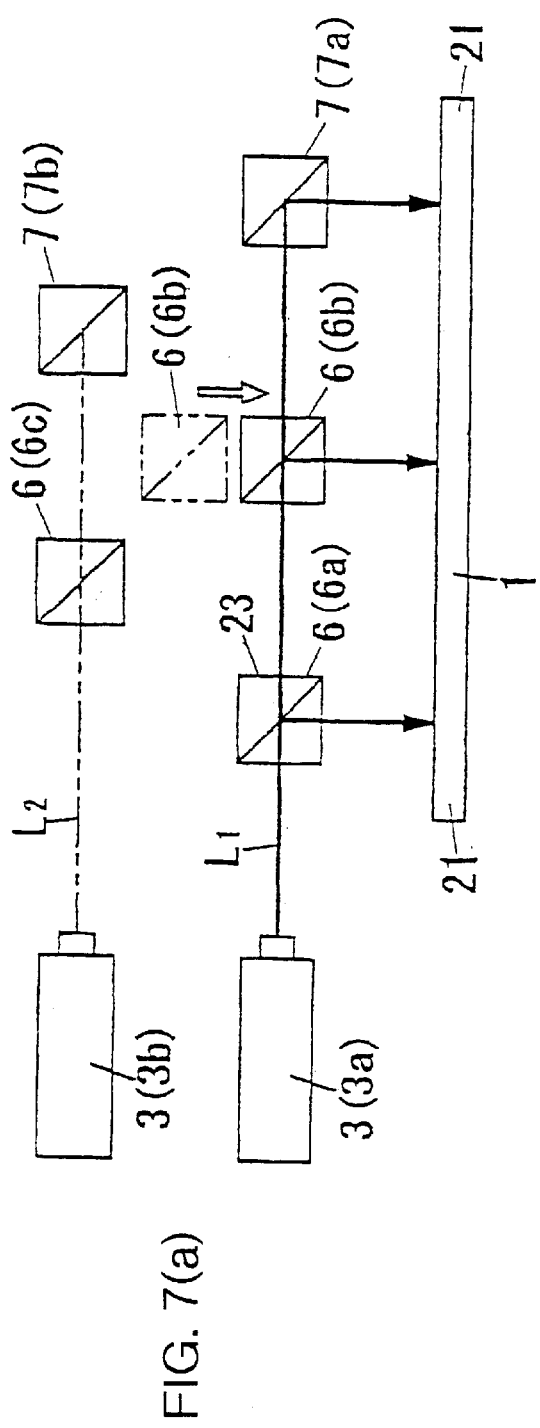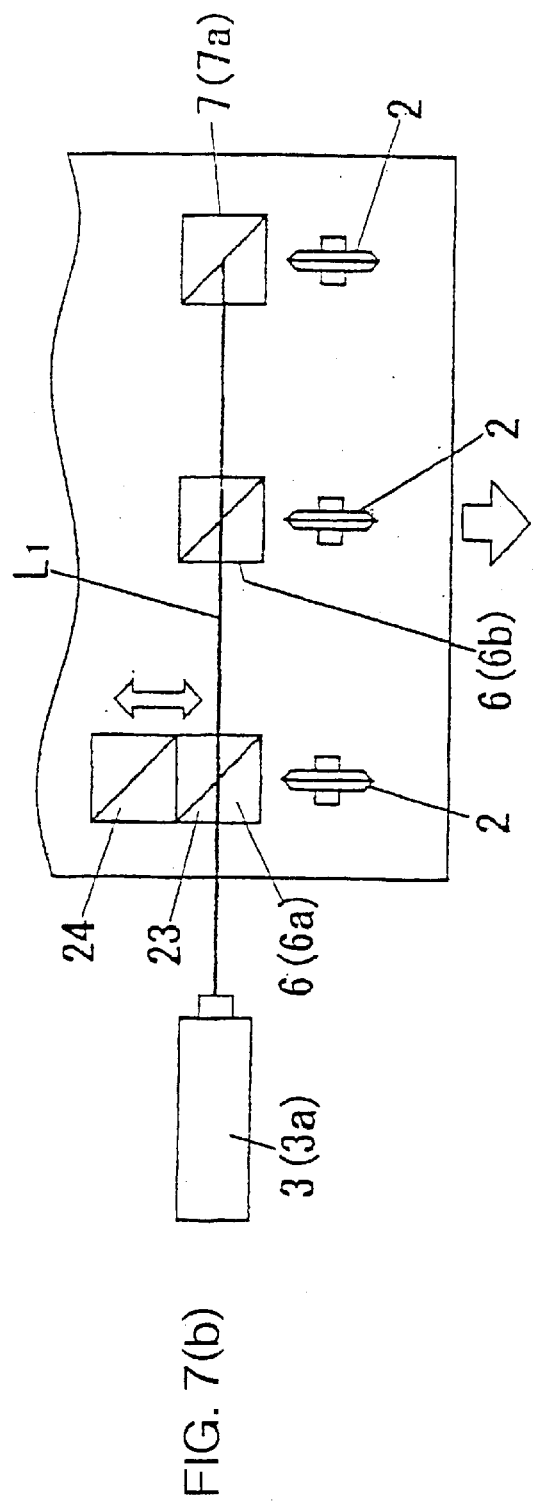
FIG. 7(a)
FIG. 7(b)

METHOD OF MANUFACTURING PREPREG

BACKGROUND OF THE INVENTION

1. Field of the Invention

The present invention relates to a method of cutting prepreg that is used for manufacturing a laminated plate.

2. Description of the Background Art

Prepreg is formed into an elongated shape through the following processes: an elongated base member such as glass cloth or paper is impregnated with a varnish of a thermosetting resin; and heated and dried so that the thermosetting resin is semi-set. The dried prepreg is cut along a length direction and in a width direction orthogonal to the length direction into a rectangular shape that has a constant dimension. The cut prepreg is next applied. For example, a plurality of sheets of prepreg cut as described above are superposed with both of the surfaces of each sheet covered with copper foil, etc. The superposed sheets are heated and pressed to form a molded product. Thus, a copper-clad laminate is manufactured.

When cutting prepreg in the manner described above, a cutting blade, such as a guillotine, a rotary cutter, a shirring blade or a saw blade, is used. However, since the prepreg is formed by a fragile semi-set resin adhering to a base member, the cutting process tends to generate cutting dust of the resin and the base member. The cutting dust is scattered around to cause degradation in the work environment. Furthermore, the cutting dust tends to adhere to the prepreg and to be mixed into the molded product or affixed thereon as foreign matter when molded in the next process with the copper foil. In recent years, there have been increasing demands for high-density circuit patterns that are very sensitive to foreign matter. Thus, there have been strong demands for the prevention of the generation of cutting dust that is introduced into the work environment.

In order to solve this problem, a method has been proposed in which a portion of prepreg to be cut is heated by an infrared heater and thereby softened. The prepreg is cut at the softened portion so that it is possible to prevent the generation and scattering of cutting dust. However, when the prepreg is heated by an infrared heater as mentioned above, portions other than the portion of the prepreg to be cut are also widely heated with the result that the prepreg resin in the heated portions may set, resulting in degradation in the quality.

Moreover, as disclosed in Japanese Laid-Open Patent Application No. 3-94988, another method in which a laser light beam is used to cut prepreg has been proposed. In this method, the prepreg is cut not by a shearing force, etc., but by a burning process of a laser light beam. Therefore, the prepreg can be cut without generating cutting dust. However, in this method, both the base member and the resin need to be simultaneously cut by using a laser light beam. Thus, when the base substrate is made of glass fibers, it is necessary to use a laser light beam with high output power. The resulting problem is that the resin is carbonized due to irradiation of the high-power laser light beam, resulting in degradation in the quality.

The present invention has been devised to solve the above-mentioned problems, and its objective is to provide a method of cutting prepreg which eliminates the necessity of applying a heating process, etc., to portions other than a portion of the prepreg to be cut, and which can also prevent the generation of cutting dust when cutting.

SUMMARY OF THE INVENTION

According to an aspect of the present invention, a method of cutting prepreg that has been formed by impregnating a base member with a resin and semi-cured into a predetermined dimension, is provided. The method includes directing a laser light beam onto a surface of the prepreg to soften the resin of the portion irradiated by the laser light beam, and cutting the softened portion of the resin with a cutting blade. With this arrangement, the cutting blade cuts the softened portion of the prepreg resin so that it becomes possible to prevent the resin from scattering as cutting dust when cutting with the cutting blade.

According to a further aspect of the present invention, the method of cutting prepreg has an arrangement wherein the laser beam is directed to the prepreg with an irradiation position being fixed while the prepreg is being fed (transferred) so that the prepreg resin of the portion irradiated with the laser beam is heated and softened. Furthermore, the softened portion of the prepreg is cut by a cutting blade that is placed forward of the irradiation position with respect to the feeding direction of the prepreg. With this arrangement, the prepreg resin is heated and softened at the portion irradiated with the laser light beam, and cut by a cutting blade that is placed forward of the irradiation position in the feeding direction. Therefore, it is not necessary to shift the position of the laser light beam and the cutting blade. Moreover, as the prepreg is transferred, the portion at which the resin is heated and softened by the irradiation of the laser light beam is cut so that the generation of cutting dust due to the cutting process is prevented.

According to a further aspect of the present invention, the method of cutting prepreg has an arrangement in which the irradiation position of the laser light beam is shifted when irradiating the surface of the prepreg. Thus, it is possible to freely shift the cutting position.

According to a further aspect of the present invention, the method of cutting prepreg has an arrangement in which the cut end portion of the prepreg is irradiated with a laser light beam after being cut by the cutting blade. With this arrangement, the laser light beam further softens and fuses the cut end portion of the prepreg so that the prepreg forms a smooth face. Thus, resin dust is prevented from coming off the cut end face of the prepreg.

According to a further aspect of the present invention, the method of cutting prepreg has an arrangement in which a laser light beam is fixed with respect to the portion of the prepreg cut by the cutting blade while the prepreg is being transferred. With this arrangement, the irradiation positions of the laser light beam and the cutting blade do not have to be shifted. Furthermore, as the prepreg is transferred, the cut portion of the prepreg can be heated so that resin dust is prevented from coming off the cut end face of the prepreg.

According to a further aspect of the present invention, the method of cutting prepreg has an arrangement in which a carbon oxide gas laser is used as the laser light beam. With this arrangement, by properly selecting the output of the carbon oxide gas laser, it is possible to heat and soften the prepreg resin without causing carbonization thereof.

According to a further aspect of the present invention, the method of cutting prepreg has an arrangement in which the cutting blade comprises upper and lower rotary blades with at least the lower rotary blade being driven to rotate. With this arrangement, the rotation of the rotary blades can be controlled depending on the state of the prepreg.

According to a further aspect of the present invention, the method of cutting prepreg has an arrangement in which a reflection mirror is placed on a light path of a laser light beam emitted from a laser oscillator so that a laser light beam is reflected by the reflection mirror to a predetermined irradiation position of the prepreg. With this arrangement, by changing the number, the positions and the angles of one or more reflection mirrors, the irradiation position of the laser beam is easily adjusted without requiring a change of the position of the laser oscillator.

According to a further aspect of the present invention, the method of cutting prepreg has an arrangement in which a light-converging lens is placed at an outlet that outputs the reflected laser light beam from the at least one reflection mirror so that the laser light beam that has passed through the light-converging lens is directed onto the prepreg. With this arrangement, even when the distances of the light paths from the laser oscillator to the irradiation positions of the laser light beam on the prepreg increase, it is possible to correct a widened laser light beam by allowing it to pass through the light-converging lens, and thereby reduce the deviations of the laser light output that is directed to the prepreg.

According to a further aspect of the present invention, the method of cutting prepreg has an arrangement wherein reflection mirrors are placed at positions forward and rear of a cutting blade along the light path of a laser light beam from the laser oscillator, with the reflection mirror on the side closer to the laser oscillator able to shift to a position out of the light path of the laser light beam from the laser oscillator. With this arrangement, the prepreg may be cut with the cutting blade at the portion that has been softened by the irradiation of the laser light beam, even when the transfer direction of the prepreg varies.

According to a further aspect of the present invention, the method of cutting prepreg has an arrangement wherein a partial reflection mirror that transmits one portion of directed laser light beam and that reflects the other portion to the prepreg, as well as a total reflection mirror that reflects the laser light beam that has passed through the partial reflection mirror to the surface of the prepreg, are placed on the light path of the laser light. Furthermore, of the laser light beam reflected by the partial reflection mirror and the laser light beam reflected by the total reflection mirror, one is directed to the prepreg at the forward position in the advancing direction of the cutting blade and the other is directed to the cut end face of the prepreg. With this arrangement, it is possible to direct the laser light beam to the prepreg at the position forward, in the advancing direction of the cutting blade, as well as at the position to the rear thereof, using a single laser generator.

According to a further aspect of the present invention, the method of cutting prepreg has an arrangement wherein the partial reflection mirror and/or the total reflection mirror and the cutting blade are movably and integrally formed as a single unit. With this arrangement, as the cutting position shifts, the laser generator can direct the laser light beam relative to the cutting position of the prepreg to be cut by the cutting blade.

According to a further aspect of the present invention, the method of cutting prepreg has an arrangement wherein a partial reflection mirror that reflects one portion of the laser light beam and that transmits the other portion and a total reflection mirror for totally reflecting the laser light beam that has passed through the partial reflection mirror are placed on the light path of the laser light beam from the laser oscillator. One of the reflected laser light beams is directed to a position at a rear of the cutting blade in the prepreg feeding direction so as to soften the prepreg resin, with the other being directed to the cut portion at a position forward of the cutting blade in the prepreg feeding direction. With this arrangement, the laser light beam from a single laser oscillator is split and directed to a forward position as well as a position to the rear of the cutting blade so that it is possible to reduce the number of laser oscillators and consequently to reduce the installation costs.

According to a further aspect of the present invention, the method of cutting prepreg has an arrangement wherein laser light beams emitted from a plurality of laser oscillators are converged and directed to the prepreg. With this arrangement, the output of the laser light beam from each laser oscillator is lower, reducing hazards associated with the device.

According to a further aspect of the present invention, the method of cutting prepreg has an arrangement wherein the laser light beam is directed to the prepreg with its focal point offset from the surface of the prepreg. With this arrangement, the surface temperature of the prepreg to be irradiated and the spot diameter of the laser light beam can be easily controlled so that it is possible to adjust the energy of the laser light beam on the surface of the prepreg, and consequently to prevent the prepreg resin at the irradiated portion from being carbonized.

According to a further aspect of the present invention, the method of cutting prepreg has an arrangement wherein the laser light beam, emitted from the laser oscillator, passes through an optical fiber, and is directed to a predetermined irradiation position of the prepreg. With this arrangement, it becomes possible to easily adjust the irradiation position of the laser light beam by adjusting the tip position of the optical fiber, without requiring a change in the position of the laser oscillator.

According to a further aspect of the present invention, the method of cutting prepreg has an arrangement in which the temperature of the prepreg at the irradiation position of the laser light is detected, and based upon this detected temperature, at least one of the output of the laser light beam from the laser oscillator and the transporting speed of the prepreg is adjusted. With this arrangement, when the detected temperature is low, a feed-back controlling operation for increasing the output of the laser light beam and for decreasing the transporting speed of the prepreg is carried out, and when the detected temperature is high, a feed-back controlling operation for reducing the output of the laser light beam and for increasing the transporting speed of the prepreg is carried out. Thus, the prepreg resin is consistently heated at an optimal temperature and cut in a softened state.

According to a further aspect of the present invention, the method of cutting prepreg has an arrangement wherein a partial reflection mirror that reflects one portion of the laser beam and transmits the other portion thereof and a total reflection mirror that totally reflects the laser light beam that has passed through the partial reflection mirror are placed on the light path of the laser light beam from the laser oscillator in the width direction orthogonal to the feeding direction of the prepreg so that the reflected laser light beams are respectively directed to the prepreg. With this arrangement, the laser light beam from a single laser oscillator is split and directed to a plurality of portions, in the width direction of the prepreg, so that the resin is simultaneously softened at a plurality of portions in the width direction of the prepreg and the prepreg can be cut simultaneously at a plurality of positions in the feeding direction.

According to a further aspect of the present invention, the method of cutting prepreg has an arrangement wherein a plurality of partial reflection mirrors are placed on the light path of the laser light beam, with the respective partial reflection mirrors shifting between positions on the light path of the laser light beam and positions out of the light path, so that the laser light beams reflected by the partial reflection mirrors positioned on the light path of the laser light beam are directed to the prepreg. With this arrangement, the positions and the number of branches of the laser light beam from the laser oscillator can be changed by shifting the partial reflection mirrors so that the cutting positions of the prepreg and the number of cuts can be easily changed.

According to a further aspect of the present invention, the method of cutting prepreg has an arrangement wherein a plurality of partial reflection mirrors are placed on the light path of the laser light beam and a shutter is placed on an outlet through which each of the reflected laser lights of the partial reflection mirrors is output, so that laser light beams reflected by the partial reflection mirrors with the shutters open are directed to the prepreg. With this arrangement, the positions and the number of the branches of the laser light beam from the laser oscillator can be changed by opening and closing the shutters so that the cutting positions of the prepreg and the number of cuts can be easily changed.

According to a further aspect of the present invention, a prepreg cutting apparatus is provided. The prepreg cutting apparatus cuts prepreg formed by impregnating a base member with a resin and semi-curing the impregnated base member. The prepreg cutting member includes a laser light source that emits a laser light beam that is directed onto a surface of the prepreg to soften the resin of the portion irradiated by the laser light beam, and a cutting instrument that cuts the softened portion of the resin with a cutting blade.

According to a further aspect of the present invention, a prepreg cutting apparatus includes a first reflection mirror that reflects a laser light beam to a first portion of prepreg. Resin of the first portion of prepreg is heated by the laser beam. As a result of the heating of the prepreg, dust is prevented from being generated when the prepreg is cut by the prepreg cutting apparatus.

According to a further aspect of the present invention, a prepreg cutting apparatus includes a partial reflection mirror that reflects a first portion of a laser beam from a laser light source to a second portion of prepreg. The partial reflection mirror also transmits a second portion of the laser beam to the first reflection mirror. The partial reflection mirror can be used to split a laser light beam and thereby provide two laser light beams that can be applied to different portions of a prepreg.

According to a further aspect of the present invention, a prepreg cutting apparatus includes a light-converging lens that converges a laser light beam reflected from a first reflection mirror. The light-converging lens can be used to converge or widen a laser light spot on a portion of prepreg irradiated by a laser light.

According to a further aspect of the present invention, a prepreg cutting apparatus includes a cutting blade, a first reflection mirror and a second partial reflection mirror that are integrally and movably formed as a single unit. As a single unit, the cutting apparatus can move elements in a same direction at a same movement speed.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 7(a) is a schematic view of a cutting system in accordance with a seventh embodiment of the present invention;

FIG. 7(b) is a top view of a cutting system in accordance with a seventh embodiment of the present invention;

EMBODIMENTS OF THE PRESENT INVENTION

Figure 1B:
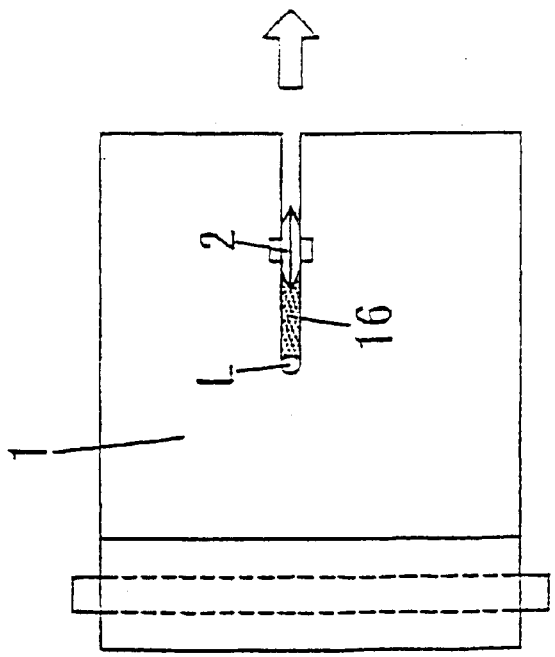
FIG. 1(b) is a top view of a cutting system in accordance with a first embodiment of the present invention.

The following description will discuss embodiments of the present invention. The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken together with the drawings making apparent to those skilled in the art how the several forms of the present invention may be embodied and carried out in practice.

Prepreg 1 is formed through the following processes: an elongated base member such as glass cloth or paper is put into an impregnation vessel to be impregnated with a varnish of a thermosetting resin, such as an epoxy resin, a polyimide resin or an unsaturated polyester resin. The impregnated base member is heated and dried by being passed through a heating and drying furnace to semi-set the thermosetting resin so as to have an elongated shape. The resulting product is stored in sheet form or roll form.

FIG. 1 shows one example of a preferred embodiment of a method for cutting the prepreg 1 in the length direction. In this method, a cutting device comprises a cutting blade 2 for cutting the prepreg 1, a laser oscillator 3 for emitting a laser light beam, a reflection mirror 4 which reflects the laser light beam emitted from the laser oscillator 3 to the prepreg 1, and a feeding roll 15 which feeds the prepreg 1. The cutting blade 2 is formed as a slitter which comprises a cutting edge 2a and a cutting edge receiver 2b. Furthermore, with respect to the laser oscillator 3, for example, a carbon dioxide gas laser oscillator may be adopted. The carbon dioxide gas laser is preferably used in this invention, since it can heat the resin of the prepreg 1 without causing carbonization of the resin of the prepreg 1, when the output is properly selected. The particular lasers and cutters in the above embodiments are merely examples. Other types of lasers and other types of cutters can be used within the scope of the above invention.

Figure 1A:
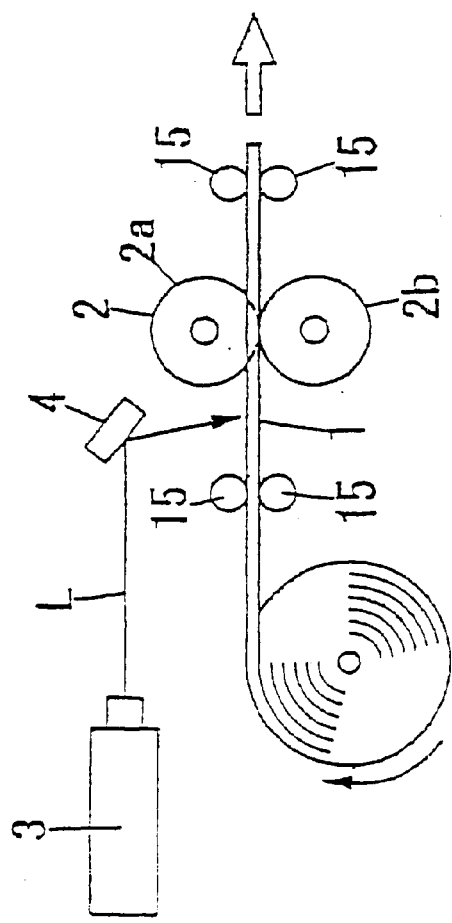
FIG. 1(a) is a schematic view of a cutting system in accordance with a first embodiment of the present invention.

As can be seen in FIG. 1(a), the elongated prepreg 1, wound onto a roll, is fed from the feeding rolls 15, and transported in the length direction so as to be cut in the length direction by the cutting blade 2. Moreover, the reflection mirror 4 is placed above the prepreg 1. A laser light beam L, emitted from the laser oscillator 3, is reflected by the reflection mirror 4 onto the surface of the prepreg 1 at a position to the rear of the cutting blade 2 in the feeding direction of the prepreg 1. When the laser light beam L is directed to the prepreg 1 in this manner, the portion irradiated by the laser light beam L is heated and the resin at this portion is softened. At this time, since the prepreg 1 is continuously fed from the feeding roll 15 in the length direction, the softened portion 16 of the resin is formed in a straight line shape, as shown in FIG. 1(b), and when the prepreg 1 is further fed from the feeding roll 15 in the length direction, this line-shaped softened portion 16 passes through the cutting blade 2 so that the prepreg 1 is cut by the cutting blade 2 along the softened portion 16.

In this manner, the irradiation of the laser light beam L makes it possible to cut the prepreg 1 along the softened portion of the resin so that it becomes possible to prevent the generation of cutting dust of the resin and cutting dust of the base member due to the cutting operation. Moreover, the laser light beam L is directed to the prepreg 1 as thin luminous fluxes of parallel light rays so that only the portion irradiated by the laser light beam L is heated. Thus, it is possible to avoid the situation in which a wide area of the prepreg 1 is unnecessarily heated, resulting in the resin setting, and thereby degrading the quality of the prepreg 1. Furthermore, since the laser light beam L is not used for cutting the prepreg 1, it is not necessary to use a laser with high output. Therefore, the application of the laser light beam L causes neither carbonization of the resin, nor degradation in the quality of the prepreg. For example, the cutting process can be carried out with a feeding speed of the prepreg 1 of 60 n/min, an output of the laser oscillator 3 of 100 W and a beam diameter of the laser light beam L of 2 to 5 mm.

Moreover, it is only necessary to feed the elongated prepreg 1 from the roll and to transport it in the length direction, with the irradiation position of the laser light beam L and the position of the cutting blade 2 being fixed. Thus, it becomes possible to soften the resin by the laser light beam L and to cut the prepreg 1 with the cutting blade 2 at the softened portion of the resin. Therefore, it is possible to eliminate the need for devices that shift the cutting blade 2 and the irradiation position of the laser light L. Consequently this makes the entire structure of the cutting device simpler. As shown in a preferred embodiment of FIG. 1(a), the laser light beam L emitted from the laser oscillator 3 is reflected by the reflection mirror 4 and directed to a predetermined irradiation position of the prepreg 1. Therefore, the cutting position of the prepreg 1 is easily changed by changing only the angle of the reflection mirror 4 without the necessity of changing the position of the laser oscillator 3, and the distance between the irradiation position of the laser light beam L and the cutting blade 2 can be easily adjusted.

Figure 2:
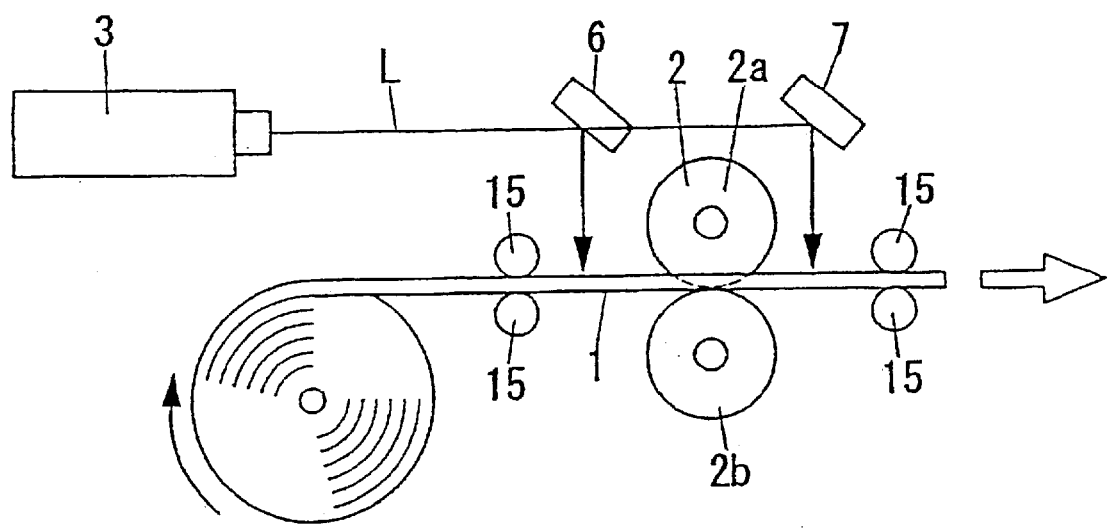
FIG. 2 is a schematic view of a cutting system in accordance with a second embodiment of the present invention.

In the preferred embodiment shown in FIG. 2, a partial reflection mirror 6 and a total reflection mirror 7 are placed on the light path of a laser light beam L emitted from the laser oscillator 3. The partial reflection mirror 6 is placed above the prepreg 1 at a position to the rear of the cutting blade 2 in the feeding direction of the prepreg 1, while the total reflection mirror 7 is placed above the prepreg 1 at a position forward of the cutting blade 2 in the feeding direction of the prepreg 1. The partial reflection mirror 6 can be formed e.g. by a half mirror, etc., so that one portion of the incident laser beam L is reflected with the other portion of the laser light beam L passing through the mirror. Moreover, the total reflection mirror 7 reflects the portion of the laser light beam L that is incident thereon.

In this arrangement, the laser light beam L emitted from the laser oscillator 3 is first made incident on the partial reflection mirror 6 so that one portion of the laser light beam is reflected by the partial reflection mirror 6 and directed to a position to the rear of the cutting blade 2 in the feeding direction of the prepreg 1. Then, as the prepreg 1 is transported, the prepreg 1 is cut along this softened portion of the resin by the cutting blade 2 in the length direction. Moreover, that portion of the laser light beam L that has passed through the partial reflection mirror 6 is reflected by the total reflection mirror 7, and directed to the portion of the prepreg 1 cut by the cutting blade 2 at a position forward of the cutting blade 2 in the feeding direction of the prepreg 1. In this manner, the laser light beam L is directed to the portion of the prepreg 1 that has been cut so that the resin of this portion is softened or melted. Thus, when dust from cutting is generated at the cut portion, the dust adheres to the softened or melted resin, thereby making it possible to prevent the cutting dust from scattering. Moreover, as the resin is softened or melted at the cut end face of the prepreg 1 in this manner, the cut end portion becomes smoother, thereby preventing resin from coming off the cut end face. Furthermore, the laser light beam L is split using the partial reflection mirror 6 and the total reflection mirror 7 so that the resin at positions rear and forward of the cutting blade 2 is simultaneously softened using the single laser oscillator 3. Thus, it becomes possible to reduce the installation costs associated with multiple oscillators.

Furthermore, in the preferred embodiment of FIG. 2, the partial reflection mirror 6 is placed at the position to the rear of the cutting blade 2 with the total reflection mirror 7 being placed at the position forward of the cutting blade 2. However, the partial reflection mirror 6 may be placed at the position forward of the cutting blade 2 and the total reflection mirror 7 may be placed at the position rear of the cutting blade 2.

Figure 3:
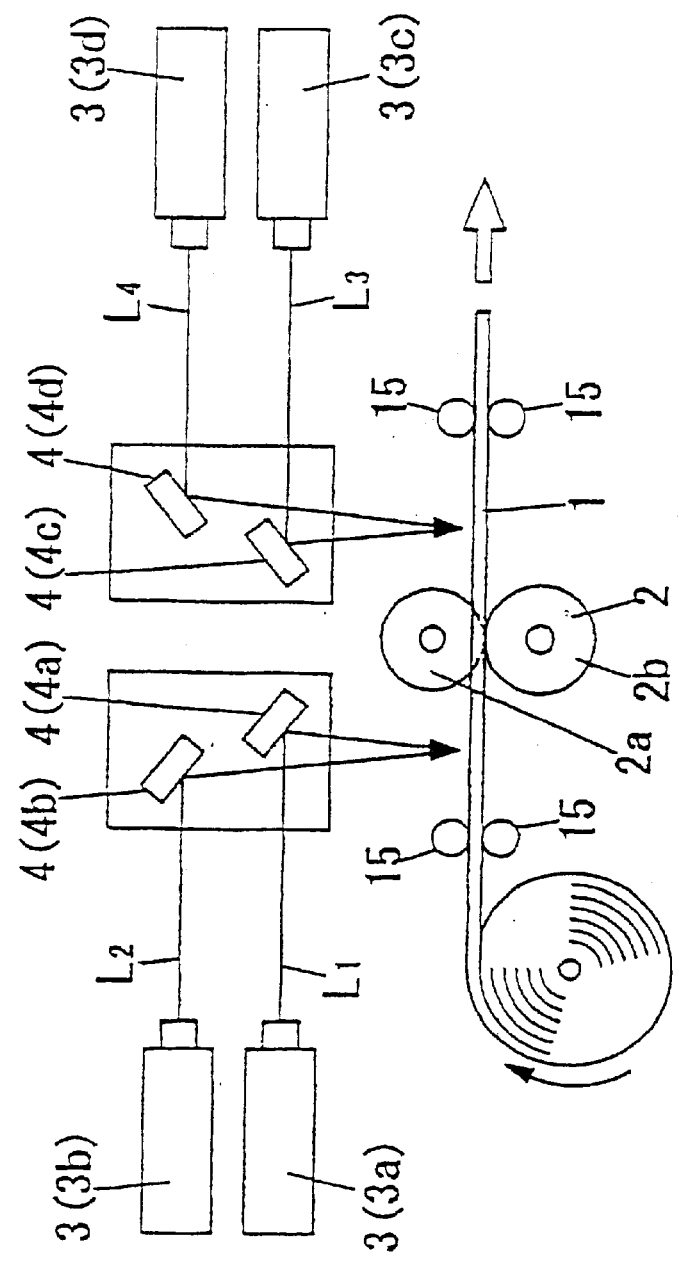
FIG. 3 is a schematic view of a cutting system in accordance with a third embodiment of the present invention.

In a preferred embodiment shown in FIG. 3, laser light beams L1 and L2 from a plurality of laser oscillators 3a and 3b are converged and directed to a position rear of the cutting blade 2 with respect to the feeding direction of the prepreg, while laser light beams L3 and L4 from a plurality of laser oscillators 3c and 3d are converged and directed to a position forward of the cutting blade 2 with respect to the feeding direction of the prepreg.

In other words, the reflection mirrors 4a and 4b corresponding to a plurality of laser oscillators 3a and 3b, are placed above the prepreg 1 at a position to the rear of the cutting blade 2. Furthermore, the reflection mirrors 4c and 4d corresponding to a plurality of laser oscillators 3c and 3b, are placed above the prepreg 1 at a position forward of the cutting blade 2.

As a result, the laser light beam L1 from the laser oscillator 3a is reflected by the reflection mirror 4a, and the laser light beam L2 from the laser oscillator 3b is reflected by the reflection mirror 4b, respectively. L1 and L2 are converged to one portion of the prepreg 1 at a position to the rear of the cutting blade 2, so that the resin of this portion of the prepreg 1 is softened. Moreover, the laser light beam L3 from the laser oscillator 3c is reflected by the reflection mirror 4c, and the laser light beam L4 from the laser oscillator 3d is reflected by the reflection mirror 4d, respectively. L3 and L4 are converged to one portion of the prepreg 1 at a position forward of the cutting blade 2, so that the resin of the prepreg 1 at the portion that has been cut by the cutting blade 2 is softened or melted.

In this manner, the laser light beams L1–L4 emitted from a plurality of laser oscillators 3 are converged and directed to the prepreg 1 so that the output of the laser light beams L1–L4, from each laser oscillator 3 can be reduced, thereby making it possible to ensure the safe application (or operation) of the device.

In a preferred embodiment shown in FIG. 4, reflection mirrors 4a and 4b corresponding to a plurality of laser oscillators 3a and 3b, are combined as a set, and installed in a mirror box 17. Mirror box 17 is placed above the prepreg 1 on one side of the cutting blade 2 in the feeding direction of the prepreg 1. Further, reflection mirrors 4c and 4d corresponding to the same laser oscillators 3a and 3b, are combined as a set, and installed in a mirror box 18. Mirror box 18 is placed above the prepreg 1 on the other side of the cutting blade 2 in the feeding direction of the prepreg 1. Moreover, the reflection mirror 4a of the mirror box 17 and the reflection mirror 4c of the mirror box 18 are placed on the light path of the laser light beam L1 from the laser oscillator 3a, and the reflection mirror 4b of the mirror box 17 and the reflection mirror 4d of the mirror box 18 are placed on the light path of the laser light beam L2 from the laser oscillator 3b. Furthermore, of the mirror boxes 17 and 18, the mirror box 17 that is closer to the laser oscillators 3a and 3b can be driven to move vertically. The reflection mirrors 4a and 4b are placed on the light paths of the laser light beams L1 and L2 from the laser oscillators 3a and 3b when mirror box 17 is lowered. However, the reflection mirrors 4a and 4b are out of the light paths of the laser light beams L1 and L2 from the laser oscillators 3a and 3b when the mirror box 17 is raised.

Figure 4A:
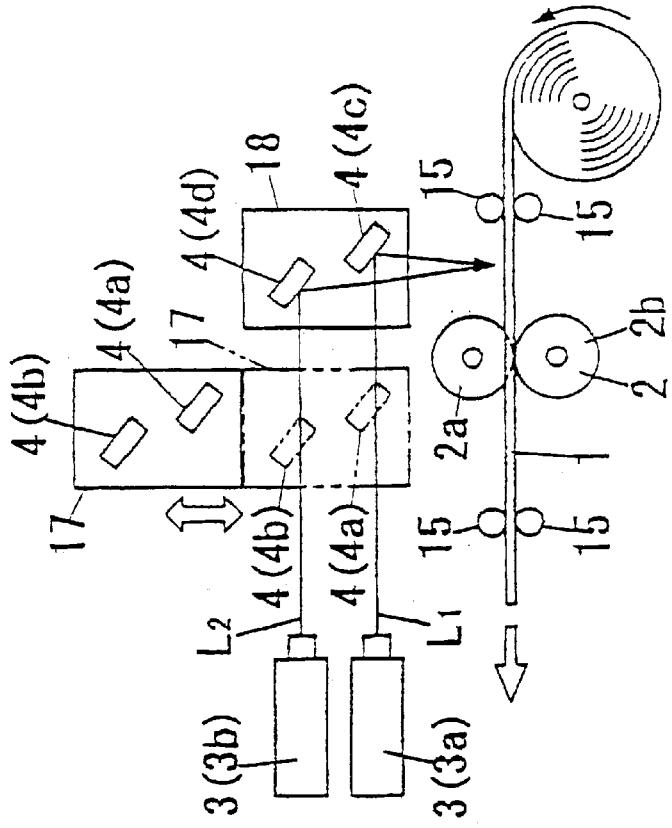
FIGS. 4(a) and 4(b) are schematic views of a cutting system in accordance with a fourth embodiment of the present invention.

Here, in the case when the prepreg 1 is transported forward as indicated by the arrow in FIG. 4(a), the mirror box 17 is lowered so that the laser light beams L1 and L2, from the laser oscillators 3a and 3b, are reflected by the reflection mirrors 4a and 4b in the mirror box 17. Thus, the converged laser lights L1 and L2 are directed to the prepreg 1 at a position to the rear of the cutting blade 2 in the feeding direction of the prepreg 1 so that a portion of the resin softened by the irradiation of the laser light beams L1 and L2 is cut by the cutting blade 2.

Figure 4B:
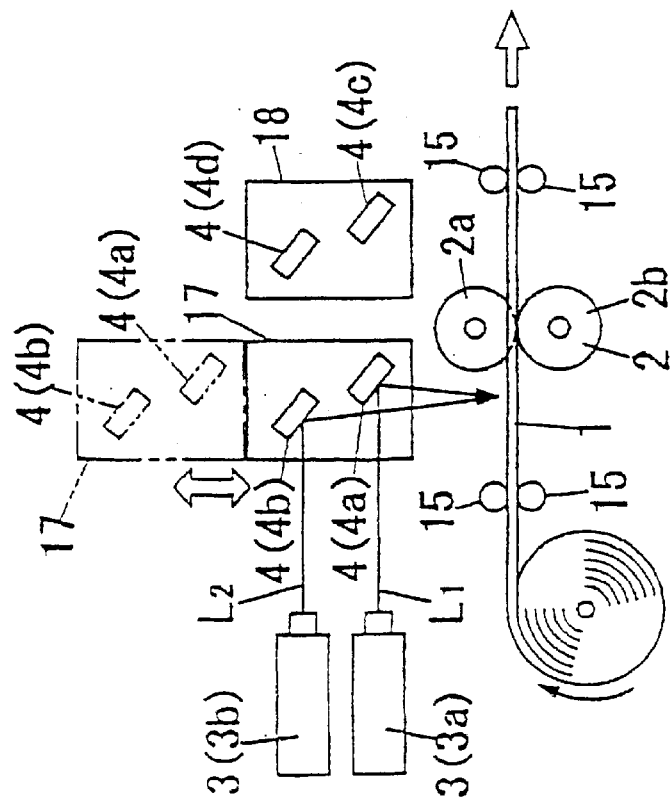

Moreover, in the case when the prepreg 1 is transferred forward as indicated by the arrow in FIG. 4(b), e.g. opposite of the forward direction indicated in FIG. 4(a), the mirror box 17 is raised. In this case, the laser light beams L1 and L2, from the laser oscillators 3a and 3b, pass below the mirror box 17, and are reflected by the reflection mirrors 4c and 4d of the mirror box 18. Thus, the converged laser light beams L1 and L2 are directed to the prepreg 1 at a position to the rear of the cutting blade 2 in the feeding direction of the prepreg 1 so that a portion of the resin softened by the irradiation of the laser light beams L1 and L2 is cut by the cutting blade 2.

In this manner, by selecting the reflection mirror 4 to reflect the laser light L from the laser oscillator 3 depending on the direction in which the elongated prepreg 1 is fed, the prepreg 1 can be cut by the cutting blade 2 at the portion of the resin softened by the irradiation of the laser light beam L, regardless of the direction the prepreg 1 is fed.

Figure 5:
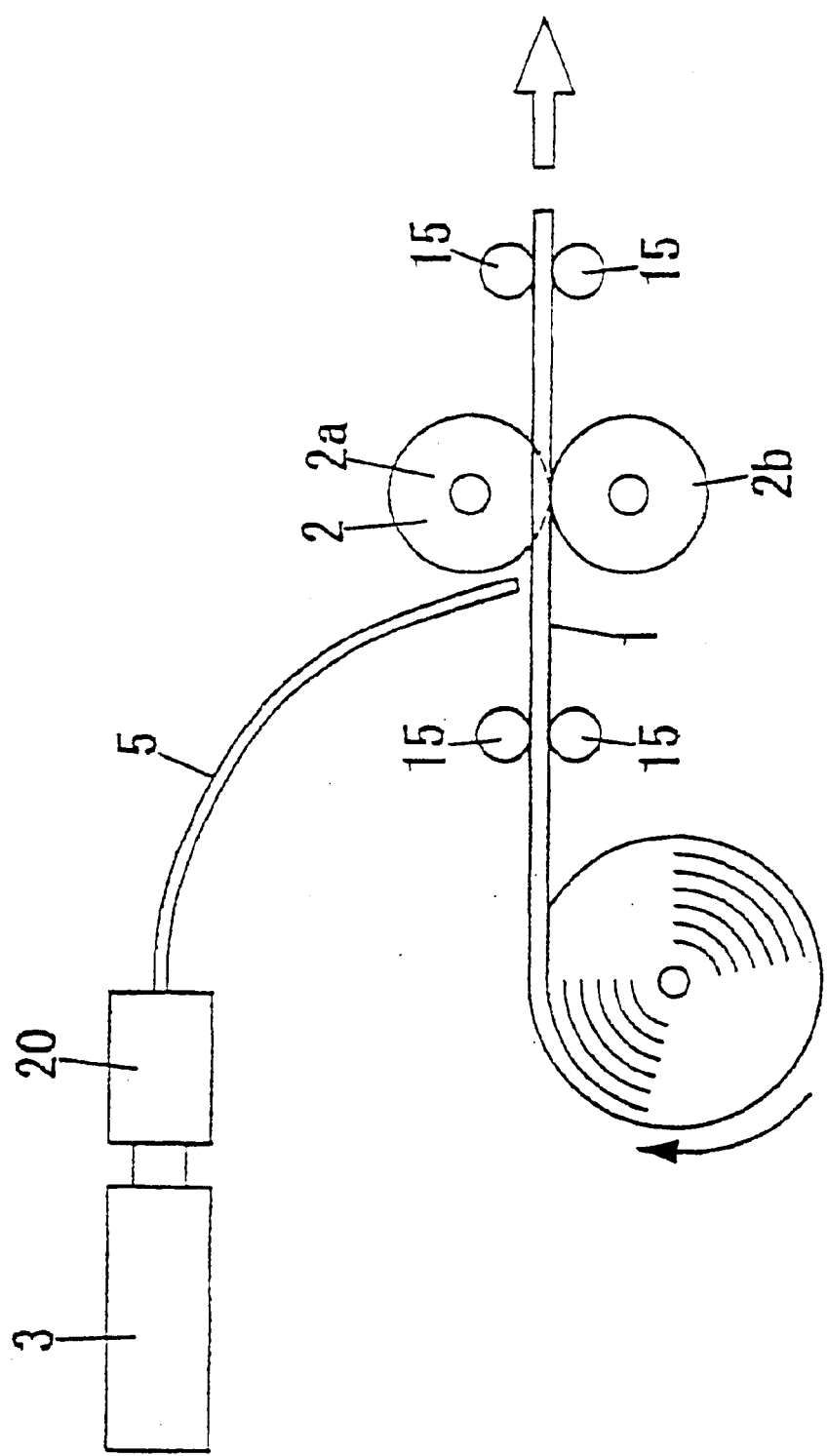
FIG. 5 is a schematic view of a cutting system in accordance with a fifth embodiment of the present invention.

In a preferred embodiment shown in FIG. 5, a flexible optical fiber 5 is connected to the laser oscillator 3 through a coupling tool 20. Here, the tip of the optical fiber 5 is placed on the prepreg 1 at a position to the rear of the cutting blade 2 in the feeding direction of the prepreg 1. With this arrangement, a laser light beam L (not shown) output from the laser oscillator 3, is made incident on the optical fiber 5. After the laser light beam L is transmitted through the optical fiber 5, it is emitted from the tip of the optical fiber 5, and directed to the prepreg 1 at the position to the rear of the cutting blade 2 so that the resin at this portion is heated and softened. The softened portion of the resin is cut by the cutting blade 2.

In this manner, the laser light beam L emitted from the laser oscillator 3 is directed through the optical fiber 5. Thus, it is possible to easily change the cutting position of the prepreg 1 by changing the position of the tip of the optical fiber 5 without changing the position of the laser oscillator 3. It also becomes possible to easily adjust the distance between the irradiation position of the laser light beam L on the prepreg 1 and the cutting blade 2. In particular, since the flexible optical fiber 5 is readily bent to adjust the tip position, the positioning can be easily carried out.

Figure 6:
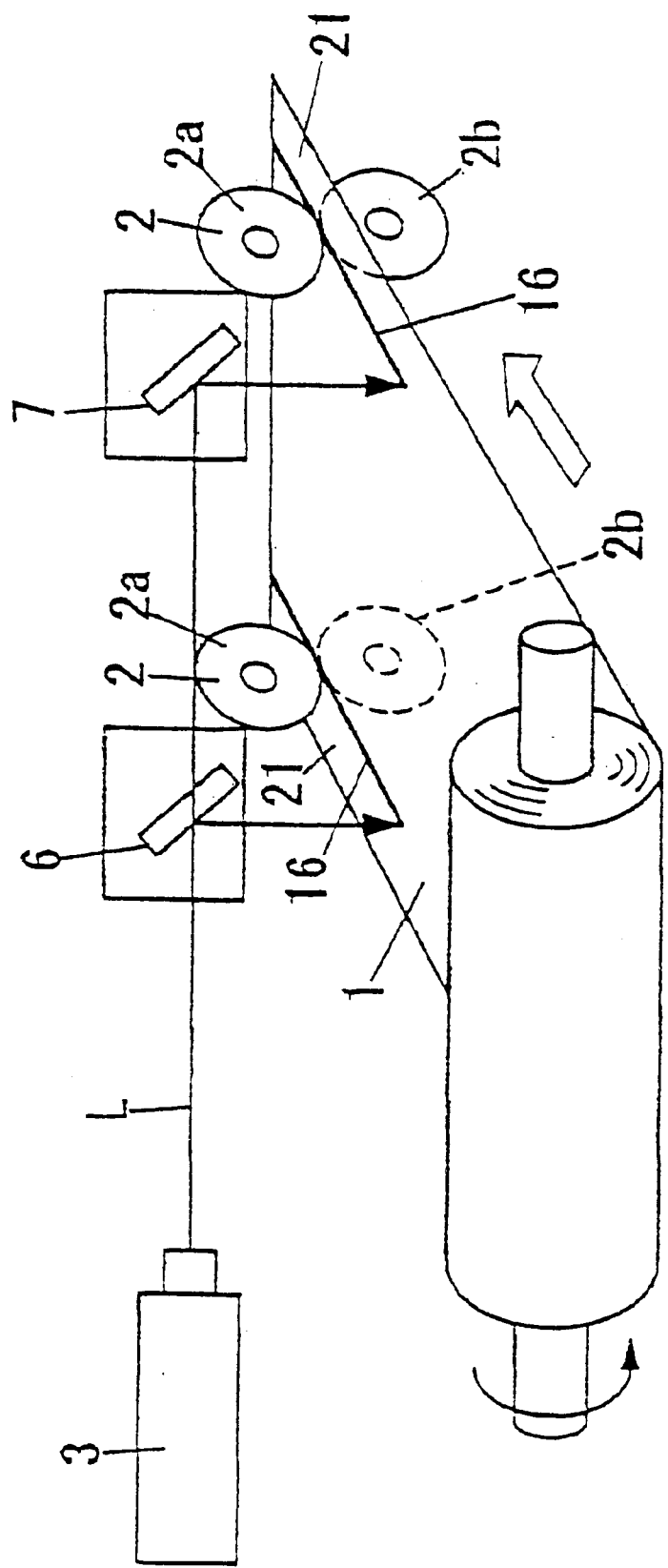
FIG. 6 is a perspective view of a cutting system in accordance with a sixth embodiment of the present invention.

FIG. 6 shows another preferred embodiment of the present invention in which a laser light beam L from the laser oscillator 3 is emitted so as to cross over the prepreg 1 in the width direction, orthogonal to the feeding direction of the prepreg 1. A partial reflection mirror 6 and a total reflection mirror 7 are placed on the light path of the laser light beam L. Moreover, cutting blades 2 are placed at both of the end positions of the prepreg 1 in the width direction, and the partial reflection mirror 6 and the total reflection mirror 7 are placed above the prepreg 1 at positions to the rear of the cutting blades 2 in the feeding direction of the prepreg 1.

In this arrangement, a laser light beam L emitted from the laser oscillator 3 is first made incident on the partial reflection mirror 6. One portion of the laser light beam is reflected by the partial reflection mirror 6 so that it is directed to a position to the rear of one of the cutting blades 2. Moreover, the laser light beam L that has passed through the partial reflection mirror 6 is reflected by the total reflection mirror 7, and directed to a position to the rear of the other cutting blade 2. The laser light beam L is directed to the positions to the rear of the respective cutting blades 2 so that the resin of the prepreg 1 is softened at these positions, and as the prepreg 1 is fed in the feeding direction, the prepreg 1 is cut along the softened portions 16 by the cutting blades 2 in the length direction.

This arrangement makes it possible to simultaneously cut the prepreg 1 at a plurality of positions using a plurality of cutting blades 2 so that it becomes possible to carry out the cutting operation with high efficiency. In particular, in the prepreg 1 formed to have an elongated shape, both of the side end portions in the width direction need to be cut off as margins 21 in most cases, and this arrangement makes it possible to cut off the margins 21 on both of the sides simultaneously. Moreover, the laser light beam L is split by the partial reflection mirror 6 and the total reflection mirror 7 so that a single laser oscillator 3 simultaneously softens the resin at a plurality of cutting positions, thereby making it possible to reduce the installation costs.

FIG. 7 shows still another embodiment of the present invention. Laser oscillators 3a and 3b are placed on upper and lower stages respectively. The light paths of laser light beams L1 and L2 from the respective laser oscillators 3a and 3b are designed so as to cross over the prepreg 1 in the width direction, orthogonal to the feeding direction, of the prepreg 1. The respective upper and lower laser oscillators 3a and 3b have different outputs. For example, the laser oscillator 3a on the lower stage is set to a maximum output of 60 W, with the laser oscillator 3b on the upper stage being set to a maximum output of 40 W. Moreover, a plurality of partial reflection mirrors 6a and 6b (two in the preferred embodiment of FIG. 7) and a total reflection mirror 7a are placed on the light path of the laser light beam L1 from the laser oscillator 3a on the lower stage, and a partial reflection mirror 6c and a total reflection mirror 7b are placed on the light path of a laser light beam L2 from the laser oscillator 3b on the upper stage. The partial reflection mirrors 6a and 6b are placed between the laser oscillator 3a and the total reflection mirror 7a, and the partial reflection mirror 6c is placed between the laser oscillator 3b and the total reflection mirror 7b. Moreover, the partial reflection mirrors 6a and 6b and the total reflection mirror 7a are placed along the width direction of the prepreg 1 at constant intervals, the partial reflection mirror 6c is placed above the middle position between the partial reflection mirrors 6a and 6b, and the total reflection mirror 7b is placed above the middle position between the partial reflection mirror 6b and the total reflection mirror 7a.

Moreover, of the partial reflection mirrors 6a and 6b, the partial reflection mirror 6b is designed to be driven to be raised and lowered by a moving device such as e.g. a hydraulic or pneumatic cylinder or an electromagnetic actuator. When the partial reflection mirror 6b is lowered, the partial reflection mirror 6b is placed on the light path of the laser light beam L1 from the laser oscillator 3a. However, when the partial reflection mirror 6b is raised, the partial reflection mirror 6b is placed out of the light path of the laser light beam L1 from the laser oscillator 3a. Moreover, as shown in FIG. 7(b), the partial reflection mirror 6a comprises a front mirror 23 and a rear mirror 24 that are placed at a front portion and a rear portion in the feeding direction of the prepreg 1. This partial reflection mirror 6a is reciprocally driven in forward and backward directions along the length direction of the prepreg 1 by an appropriate device such as, for example, a hydraulic or pneumatic cylinder etc. At the position reached after the shift backwards in the feeding direction, the front mirror 23 is placed on the light path of the laser light beam L1 from the laser oscillator 3a, while at the position reached after the shift forward, the rear mirror 24 is placed on the light path of the laser light beam L1 from the laser oscillator 3a. The front mirror 23 and the rear mirror 24 are formed by partial reflection mirrors having different reflection factors of the laser light L, and for example, the front mirror 23 has a reflection factor of 33%, while the rear mirror 24 has a reflection factor of 50%. Moreover, each of the partial reflection mirrors 6b and 6c is set to a reflection factor of 50%, and each of the total reflection mirrors 7a and 7b is set to a reflection factor of 100%.

FIG. 7(a) shows a case in which the prepreg 1 is cut at three positions, that is, in the center and at each side end portions in the width direction. Only the laser oscillator 3a on the lower stage is operated (the laser oscillator 3b on the upper stage is not operated). The partial reflection mirror 6a is shifted backward, with the partial reflection mirror 6b lowered, so that the front mirror 23 of the partial reflection mirror 6a and the partial reflection mirror 6b are placed on the light path of the laser light beam L1 from the laser oscillator 3a. In this arrangement, a laser light beam L1 is first made incident on the front mirror 23 of partial reflection mirror 6a with a reflection factor of 33%, so that 33% of the laser light L1 of 60 W is reflected by the front mirror 23, and directed to a position rear of the cutting blade 2 (not shown in FIG. 7(a)) in the feeding direction of the prepreg.

When the output of the laser light beam L1 from the laser oscillator 3a is 60 W, the laser light beam L1 of 20 W (·60 W×33%) is reflected to the prepreg 1. Next, when the laser light beam L1 of 40 W (·60 W×67%), which is not reflected by the front mirror 23 of the partial reflection mirror 6a, is made incident on the partial reflection mirror 6b with a reflection factor of 50%, 50% of the incident laser light beam L1 is reflected by the partial reflection mirror 6b. The laser light beam reflected from reflection mirror 6b is directed to a position rear of the cutting blade 2 (not shown in FIG. 7(a)) in the feeding direction of the prepreg 1, at 20 W (·40 W×50%).

Moreover, when the laser light beam L1 of 20 W (·40 W×50%) that has passed through the partial reflection mirror 6b is made inch on the total reflection mirror 7a, the entire laser light beam L1 incident on the total reflection mirror 7a is reflected by the total reflection mirror 7a. The reflected laser light beam is directed to a position rear of the cutting blade 2 (not shown in FIG. 7(a)) in the feeding direction of the prepreg 1, at 20 W.

In this manner, the laser light beams L1, each having an output of 20 W obtained by dividing the laser light beam L1 of 60 W beam into three equal portions, are directed to the positions at the rear of the cutting blades 2. The cutting blades 2 are placed at three positions in the width direction of the prepreg 1. The resin of the prepreg 1 in the respective irradiated portions is softened. Therefore, as the prepreg 1 is transported in the feeding direction, the prepreg 1 is cut by the respective cutting blades 2 along the softened resin portions in the length direction. Thus, the prepreg 1 is cut into halves in the lengthwise direction while the margins 21 on the both sides are cut off.

Figure 8:
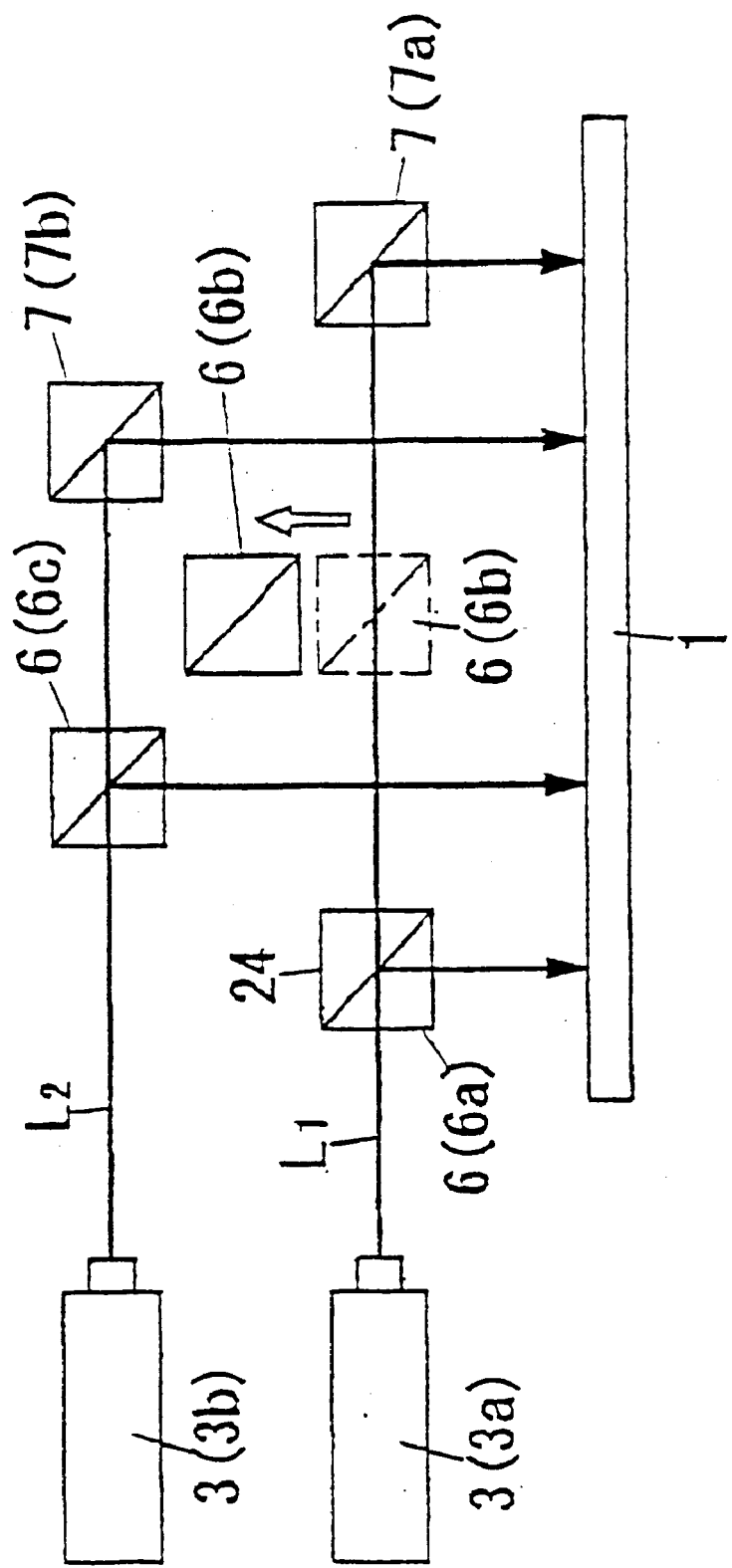
FIG. 8 is a schematic view of a cutting system in accordance with a eighth embodiment of the present invention.

FIG. 8 shows a case in which two portions on each of the sides in the width direction, that is, a total of four portions, of the prepreg 1 are cut, and the laser oscillators 3a and 3b on the upper and lower stages are both operated. The partial reflection mirror 6a is shifted forward with the partial reflection mirror 6b raised so that the rear mirror 24 of the partial reflection mirror 6a is located on the light path of the laser light beam L1 from the laser oscillator 3a without using the partial reflection mirror 6b. In this arrangement, a laser light beam L1 from the laser oscillator 3a is made incident on the rear mirror 24 of the partial reflection mirror 6a with a reflection factor of 50% so that 50% of the laser light beam L1 incident on partial reflection mirror 6a is reflected by the rear mirror 24, and directed to the position rear of the cutting blade 2 (not shown in FIG. 8) in the feeding direction of the prepreg 1. When the output of the laser light beam L1 from the laser oscillator 3a is set to 66% of the maximum output of 60 W, that is, 40 W, a laser light beam L1 of 20 W (·40 W×50%) is reflected to the prepreg 1 by rear mirror 24. Next, the laser light beam L1 of 20 W (·40 W×50%) that passes through the rear mirror 24 of the partial reflection mirror 6a is made incident on the total reflection mirror 7a. The entire laser light beam L1 incident on total reflection mirror 7a is reflected by the total reflection mirror 7a, and directed to the position at the rear of the cutting blade 2 (not shown in FIG. 8) in the feeding direction of the prepreg 1 at 20 W.

Moreover, a laser light beam L2 from the laser oscillator 3d is made incident on partial reflection mirror 6c so that 50% of the laser light beam L2 is reflected, and directed to the position at the rear of the cutting blade 2 (not shown in FIG. 8) in the feeding direction of the prepreg 1 at 20 W. When the output of the laser light beam L2 from the laser oscillator 3b is 40 W, the laser light beam L2 of 20 W (40 W×50%) is reflected to the prepreg 1 by partial reflection mirror 6c. Next, when the laser light beam L2 of 20 W (40 W×50%) that passes through the partial reflection mirror 6c the total reflection mirror 7b, the entire laser light beam L2 incident on total reflection mirror 7b is reflected by the total reflection mirror 7b, and directed to the position at the rear of the cutting blade 2 (not shown in FIG. 8) in the feeding direction of the prepreg 1 at 20 W.

In this manner, reflected portions of laser light beams L1 and L2, each having 20 W, are directed to the positions at the rear of the cutting blades 2 placed at four portions along the prepreg 1 in the width direction so that the resin of the prepreg 1 at the respective irradiated portions is softened. Therefore, as the prepreg 1 is fed in the feeding direction, the prepreg 1 is cut by the respective cutting blades 2 in the length direction along the resin softened portions, with the result that the prepreg 1 is cut into the three portions in the length direction while margins on both sides are cut off.

Figure 9:
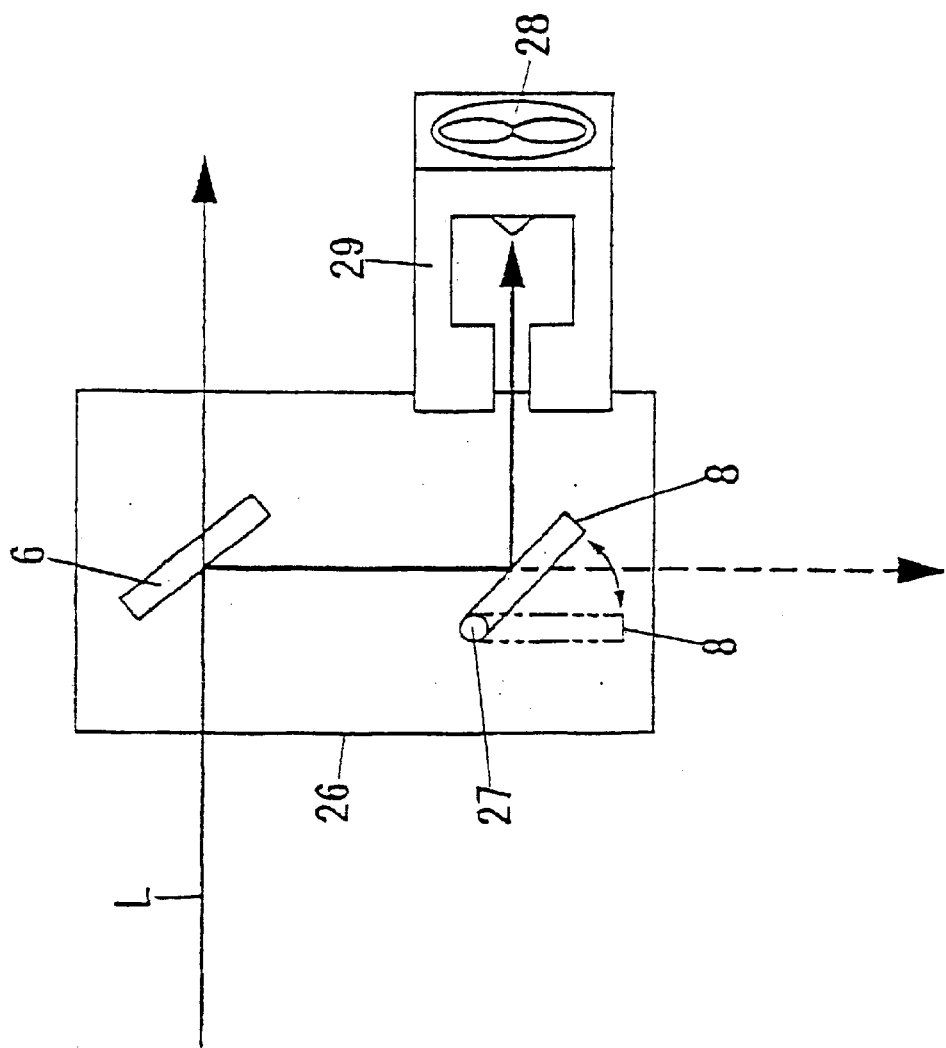
FIG. 9 is a schematic view of a cutting system in accordance with a ninth embodiment of the present invention.

Here, in the preferred embodiments of FIGS. 7 and 8, the partial reflection mirror 6(b) is driven to be raised and lowered by a moving device, etc., and may be lowered so it is positioned on the light path of the laser light beam L from the laser oscillator 3. Thus, one portion of the laser light beam L may be reflected by the partial reflection mirror 6(b), and directed to the prepreg 1. Moreover, the partial reflection mirror 6 may be raised so that the partial reflection mirror 6 is displaced from the position on the light path of the laser light beam L from the laser oscillator 3. Thus, the laser light beam L is not reflected to the prepreg 1 by the partial reflection mirror 6(b). In contrast, in a preferred embodiment shown in FIG. 9, a shutter 8 is attached to the outlet through which the laser light beam reflected by the partial reflection mirror 6 is output. By opening the shutter 8, the laser light beam L reflected by the partial reflection mirror 6 is emitted from the outlet, and directed to the prepreg 1, while by closing the shutter 8, the laser light beam L reflected by the partial reflection mirror 6 is blocked at the outlet, and not directed to the prepreg 1.

The partial reflection mirror 6 is placed within the mirror box 26, and the shutter 8 which comprises, for example, a total reflection mirror, etc., is placed at the lower outlet of the mirror box 26 so that it is rotatably driven about an axis 27. Thus, a rotation operation is carried out to lower the shutter 8 to open the outlet so that the laser light beam L reflected from the partial reflection mirror 6 is emitted through the outlet. A rotation operation is carried out to raise the shutter 8 to a tilted state to close the outlet portion so that the laser light beam L reflected from the partial reflection mirror 6 is again reflected by the shutter 8, and is not emitted from the outlet. The laser light beam L, reflected by the shutter 8, is made incident on a radiating section 29 including a fan 28, etc. there in. The radiating section 29 is placed on the side portion of the mirror box 26, and laser light beam L is dispersed from the radiating section 29 as heat. Therefore, this arrangement makes it possible to eliminate the moving device that raises and lowers the partial reflection mirror 6b in FIGS. 7(a), 7(b) and 8. Consequently, the cutting device is simplified.

Figure 10:
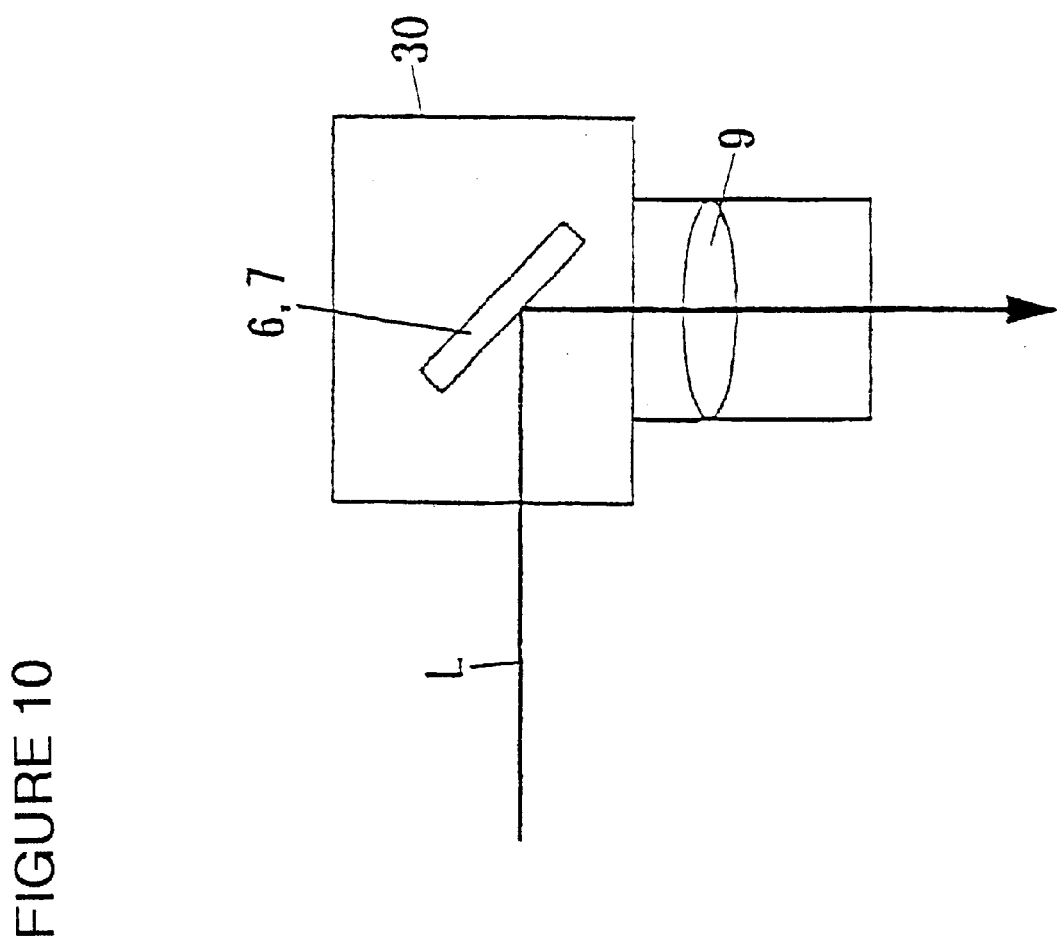
FIG. 10 is a schematic view of a cutting system in accordance with a tenth embodiment of the present invention.

Moreover, in a preferred embodiment of FIG. 10, a light-converging lens 9 is placed in each of the partial reflection mirrors 6 (6a, 6b and 6c shown in FIGS. 7 and 8) and the total reflection mirrors 7 (7a and 7b shown in FIGS. 7 and 8). The partial reflection mirrors 6 and the total reflection mirrors 7 are each installed in mirror boxes 30 respectively. The light-converging lens 9 is attached to an outlet on the lower portion of the mirror box 30 from which the laser light beam L reflected from each mirror 7 and 8 is output. Thus, the laser light beam L, reflected by the partial reflection mirror 6 and the total reflection mirror 7, is directed to the prepreg 1 after passing through the light-converging lens 9.

The light-converging lenses 9, which are attached to each partial reflection mirror 6 and each total reflection mirror 7, are set to have different focal lengths depending on, for example, the distances from the laser oscillator 3. When the length of the light path from the laser oscillator 3 to the irradiation position of the laser light beam L on the prepreg 1 varies, deviations in output tend to occur due to a widened laser light beam L. However, the laser light beam L passes through the light-converging lens 9 so that the widened beam is corrected, thereby reducing deviations in the output. Moreover, when the light-converging lenses 9, which have different focal lengths with respect to the partial reflection mirrors 6 and the total reflection mirrors 7, are installed in a manner so as to be freely exchanged, the laser light beam L can be directed to the prepreg 1 with the beam being concentrated or widened. Thus, it is possible to adjust the energy density of the irradiating laser light beam L.

Figure 11:
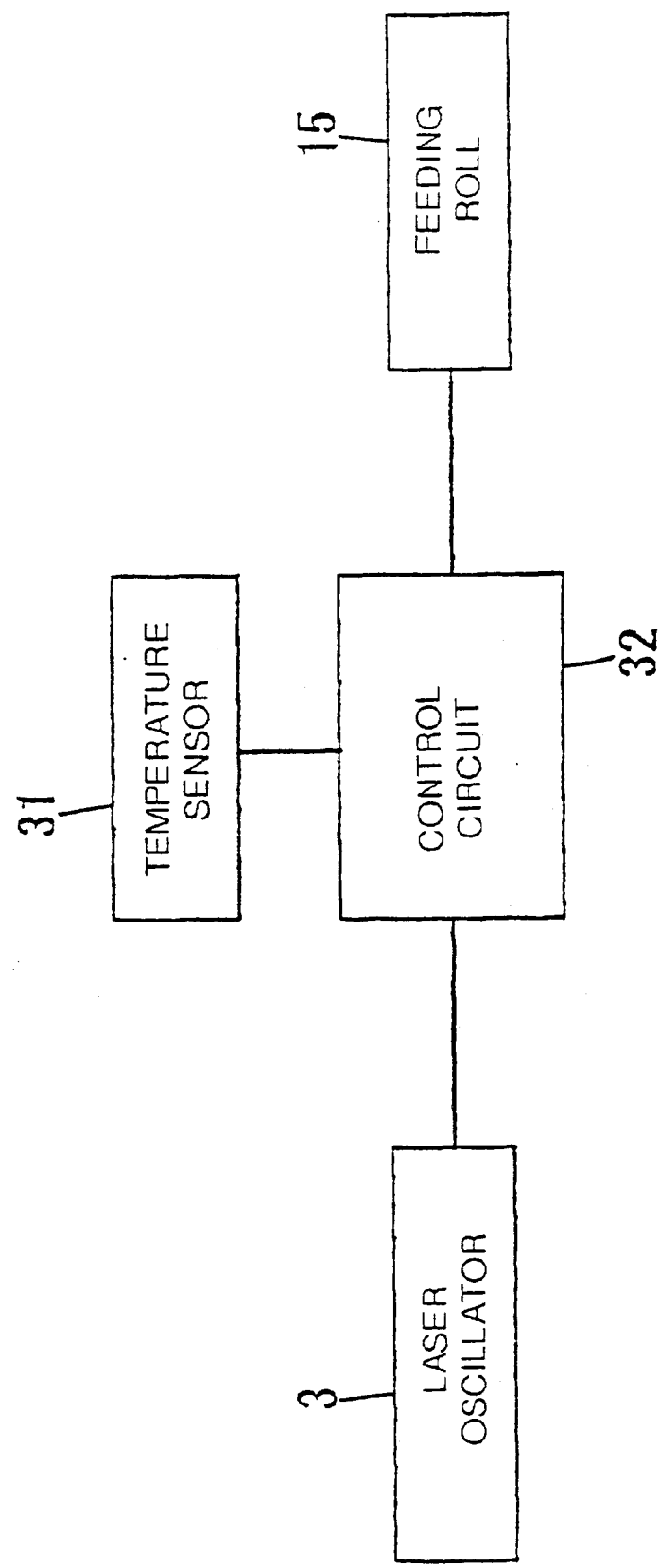
FIG. 11 is a block diagram of the cutting system.

As described in the embodiments described above, in the arrangement where the laser light beam L is directed to the prepreg 1, while the prepreg 1 is being fed in the length direction, to heat and soften the resin of the prepreg 1, the prepreg 1 is cut by the cutting blade 2 along the softened resin portion. Provision can be made to detect the surface temperature of the prepreg 1 at the portion irradiated by the laser light beam L. Based upon the detected temperature, the cutting process is carried out while controlling the application of the laser light beam L using temperature feed-back. Temperature sensors 31 (FIG. 11) are placed at the respective irradiation portions of the prepreg 1 so that the surface temperatures of the prepreg 1 at the irradiated portions are detected. Desired temperature sensors such as those of infrared sensing type may be used, and these temperature sensors 31 are connected to the control circuit 32 that is formed by installing a CPU, etc. as shown in FIG. 11.

Moreover, a driving control unit of the laser oscillator 3 and a driving control unit of the feeding roll 15 are connected to the control circuit 32.

When the temperature data detected by the temperature sensors 31 is inputted to the control circuit 32, the temperature data is compared with a pre-set temperature preliminary, and in the case when it is lower than the set temperature, since the resin of the prepreg 1 is not sufficiently softened, the output of the laser light beam L from the laser oscillator 3 is increased by an instruction from the control circuit 32. In the alternative, or simultaneously, a controlling process may be carried out to delay the operation of the feeding roll 15 so as to decrease the feeding speed of the prepreg 1. Thus, the temperature resulting from application of the laser light beam L is increased. In contrast, in the case when the temperature detected by the temperature sensor 31 is higher than a set temperature, since the temperature may cause carbonization etc., the output of the laser light beam L from the laser oscillator 3 is decreased by an instruction from the control circuit 32. In the alternative, or simultaneously, a controlling process may be carried out to increase the feeding speed of the prepreg 1. Thus, the temperature resulting from application of the laser light beam L is decreased. In this manner, a controlling operation using feed-back is carried out so that it is possible to always heat the resin of the prepreg 1 at an optimal temperature and to carry out a cutting operation with the heated portion of the prepreg 1 in an optimal softened state.

Moreover, as described in the respective preferred embodiments, upon applying the laser light beam L onto the surface of the prepreg 1, it is preferable to apply the laser light beam L in a de-focused state with the focal point of the laser light beam L offset from the surface of the prepreg 1. The adjustment of the position of the focal point of the laser light beam L can be carried out using a light-converging lens 9, etc. By offsetting the focal point of the laser light beam L from the surface of the prepreg 1, it is possible to avoid concentrating the energy of the laser light beam L onto one spot of the surface of the prepreg 1, thereby preventing carbonization. Moreover, it is possible to change the irradiation spot diameter of the laser light beam L, and consequently to easily adjust the energy density. Thus, the adjustment of the heating temperature of the prepreg 1 by the irradiation of the laser light beam L is more easily carried out. Preferably, the spot diameter of the laser is preferably set to 5 to 10 mm.

Additionally, in the above-mentioned embodiments, the elongated prepreg 1 is subject to a cutting operation while being fed in the length direction. However, the present invention may also be applied to a case in which prepreg 1 having a fixed length, such as a rectangular shape, is cut while being fed in another direction, including a direction orthogonal to the length direction.

Figure 12:
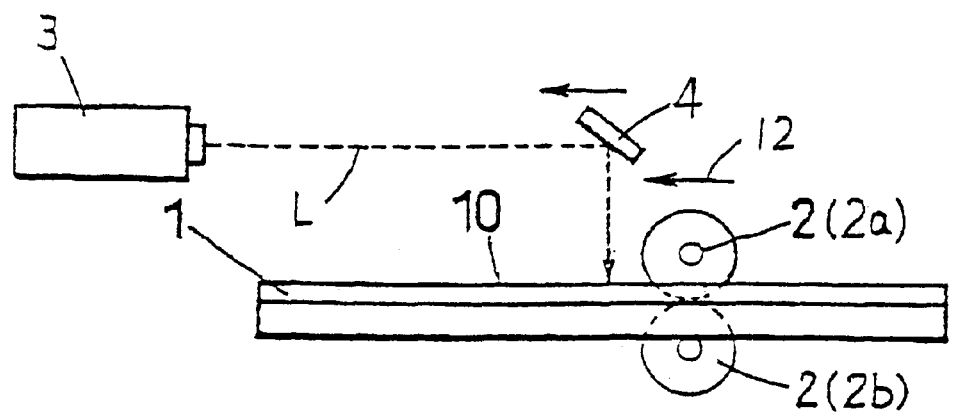
FIG. 12 is a schematic view of a cutting system in accordance with a eleventh embodiment of the present invention.

FIG. 12 is a schematic drawing that shows a cutting device of prepreg which shows one preferred embodiment of the method for cutting prepreg while the irradiation position of the laser light beam is being shifted. This device is designed to cut prepreg 1 which has been formed by making a base member impregnated with resin and semi-set having a predetermined dimension.

The cutting device comprises a movable cutting blade 2 for cutting the prepreg 1, a laser generator 3 for emitting a laser light beam L, and a movable reflection mirror 4 which directs the reflected laser light beam to the prepreg 1. The movable cutting blade 2 comprises a cutting edge 2a and a cutting edge receiver 2b, and carries out a cutting process in a direction parallel to the emission of the laser light beam L from the laser generator. A slitter blade etc. is used, for example, as the cutting device. Moreover, a carbon dioxide gas laser generator may be used, for example, as the laser generator 3. Laser generator 3 is placed in a manner so as to apply a laser light beam L in the direction of the movable reflection mirror. Moreover, the movable reflection mirror 4 which totally reflects the applied laser light beam L downward is placed on the light path of the laser light beam L, above the prepreg 1. The reflection mirror 4 is designed so as to reversibly shift on the light path of the laser light beam L, through a moving mechanism such as an electromagnetic motor or a cylinder.

The reflection mirror 4 is placed in a position forward of the cutting blade 2 in the advancing direction 12. The laser light beam L, emitted from the laser generator 3, is reflected downward by the reflection mirror 4 so that the laser light beam L is directed to the surface 10 of the prepreg 1 in a position forward of the advancing cutting blade 2. In this state, the reflection mirror 4 and the cutting blade 2 are shifted at the same constant speed with the cutting blade 2 being rotated.

Figure 16:
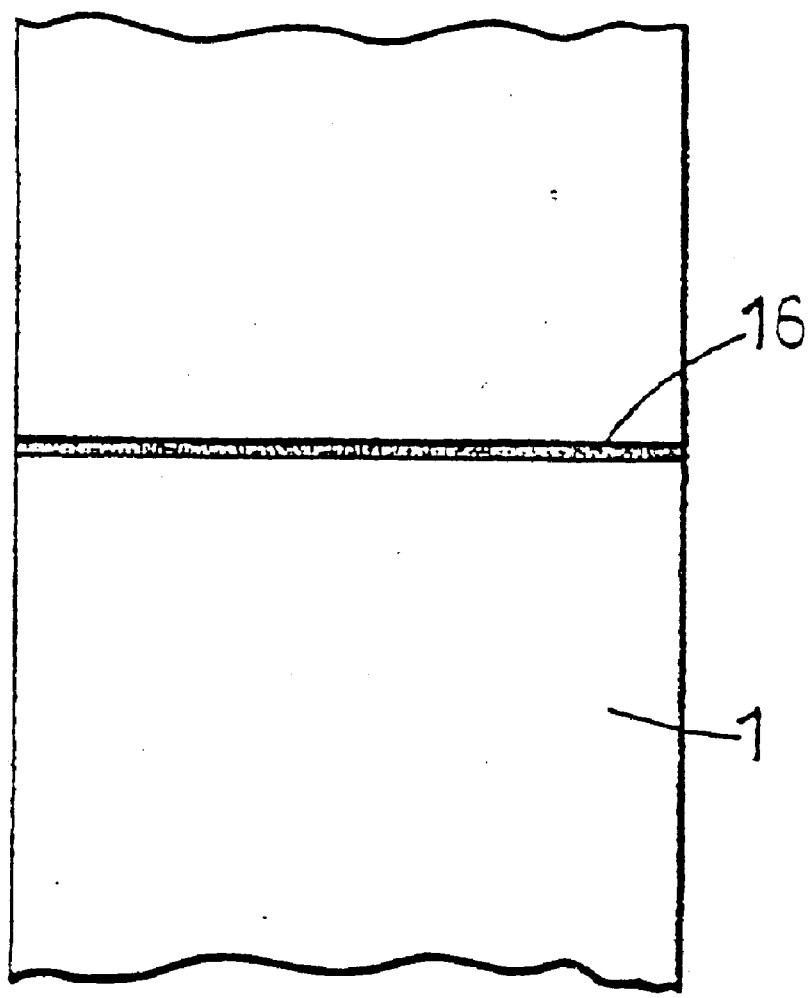
FIG. 16 is a schematic view of a state in which the resin is softened.

In the portion irradiated by the laser light beam L, since the resin contained in the prepreg 1 is softened, a portion 16 in which the resin has been softened in the width direction may be formed, as shown in FIG. 16. As described above with respect to FIG. 12, the cutting blade operates in a direction parallel to the direction of the laser light emitted from laser generator 3. Accordingly, if the prepreg 1 is not advanced as in the previous embodiments, the laser generator 3, cutting blade 2 and reflection mirror 4 may operate to soften the prepreg resin and cut the prepreg in the width direction. In the above-mentioned cutting method, the softening of the resin and the cutting process of the prepreg 1 are carried out simultaneously. However, FIG. 16 conceptually shows a state in which the resin is softened. The cutting blade 2 cuts the portion 16 having the softened resin of the prepreg 1 so that when the prepreg 1 is cut by the cutting blade 2, it is possible to prevent the resin from scattering as cutting dust. Since the resin is not scattered as cutting dust, it is possible to prevent dust from adhering to the prepreg 1 that is advanced to a subsequent process.

Moreover, the laser light beam L, reflected from the reflection mirror 4, may be applied to the surface 10 of the prepreg 1 in a state having an offset focal length (referred to as a de-focused state). When the laser light beam L is used in a state having an offset focal length, the temperature of the surface 10 of the prepreg 1 to be irradiated and the spot diameter of the laser can be easily controlled. Therefore, the above-mentioned method makes it possible to prevent the output of the laser light beam L from becoming too great to cause carbonization of the resin in the irradiated portions of the prepreg.

Here, the spot diameter of the laser is preferably set to 5 to 10 mm. Moreover, when the resin is softened using the laser light beam L applied from the laser generator 3, the output of the laser light beam L is set to, for example, 100 W, and the shifting speed of the cutting blade 2 and the reflection mirror 4 is set to 40 m/min.

Figure 13:
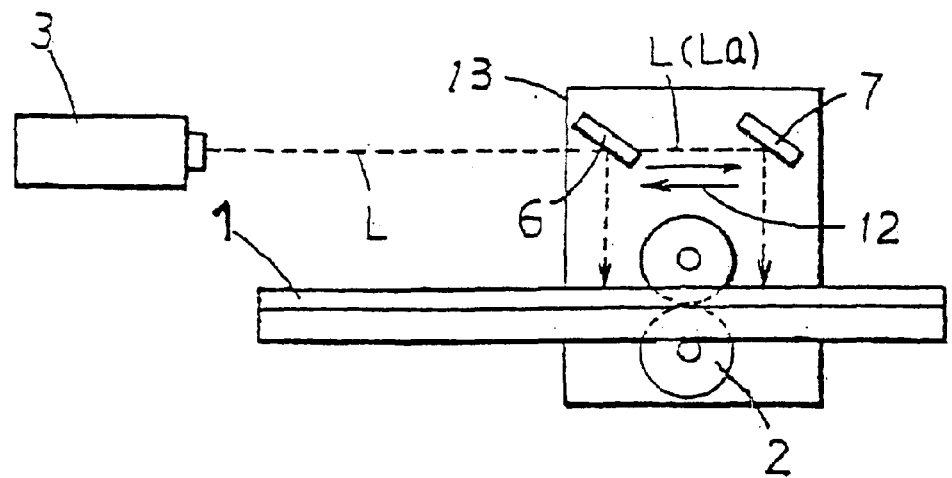
FIG. 13 is a schematic view of a cutting system in accordance with a twelfth embodiment of the present invention.

FIG. 13 is a schematic drawing that shows a prepreg in an example of another preferred embodiment of a method in accordance with the present invention. In this case, explanations will only be given of points that are different from FIG. 12. In the device of FIG. 13, a partial reflection mirror 6 and a total reflection mirror 7 are placed on the light path of the laser light beam L at positions forward and rear of the cutting blade 2. The partial reflection mirror 6 is placed on the side closer to the laser generator 3 so as to transmit one portion of the laser light beam L from the laser generator 3 while reflecting the other downward vertically. The total reflection mirror 7 is placed at the side farther from the laser generator 3 so as to reflect downward the laser light beam La that has passed through the partial reflection mirror 6. Moreover, the partial reflection mirror 6, the total reflection mirror 7 and the cutting blade 2 are placed on a sliding unit 13 so that, as the sliding unit 13 shifts, the partial reflection mirror 6, the total reflection mirror 7 and the cutting blade 2 can be shifted while maintaining a constant positional relationship.

In the cutting method of the prepreg 1 used in the cutting device shown in FIG. 13, the cutting blade 2 shifts towards the laser generator 3. The partial reflection mirror 6, placed on the front side of the cutting blade 2 in the advancing direction, transmits one portion of the laser light beam L generated from the laser generator 3, and reflects the other downward vertically to direct it to the prepreg 1 before the cutting process. Moreover, the total reflection mirror 7, placed at the rear of the cutting blade 2 in the advancing direction 12, reflects the laser light beam La that has passed through the partial reflection mirror 6 downward vertically to direct it to the cut end portion of the prepreg 1 that has been cut by the cutting blade 2.

At the portion irradiated by the laser light beam L reflected from the partial reflection mirror 6, the resin contained in the prepreg 1 is softened. The cutting blade 2 cuts the portion 16 having the softened resin in the prepreg 1. Moreover, since the laser light beam La is directed to the cut end portion of the prepreg 1 cut by the cutting blade 2, the resin of the cut end portion of the prepreg 1 is softened or melted to form a smooth end face. The above-mentioned cutting method makes it possible to melt the portion of the prepreg 1 cut by the cutting blade 2 to form a smooth cut end portion so that it becomes possible to prevent resin dust from coming off the cut end face of the prepreg 1.

Moreover, in the above-mentioned cutting method, the partial reflection mirror 6 and the total reflection mirror 7 are placed on the light path of the laser light beam L. Therefore, a single laser generator 3 can apply the laser light beams L and La to the front and the rear of the cutting blade 2, thereby making it possible to provide an efficient device.

Furthermore, the partial reflection mirror 6, the cutting blade 2 and the total reflection mirror 7 are designed to freely shift reversibly. In this case, the cutting operations can be carried out on both the advancing path and the returning path of the cutting blade 2. In the returning path of the cutting blade 2, the laser light L applied to the partial reflection mirror 6 softens the resin of the prepreg 1 before the cutting process, and the laser light beam La directed by the total reflection mirror 7 melts the resin of the cut end face of the prepreg 1 after the cutting process. In contrast, in the advancing path of the cutting blade 2, the laser light beam La applied by the total reflection mirror 7 softens the resin of the prepreg 1 before the cutting process, and the laser light beam L applied by the partial reflection mirror 6 melts the resin of the cut end face of the prepreg 1 after the cutting process.

The spot diameter of the laser is preferably set to 5 to 10 mm. Moreover, in order to soften the resin and melt the cut end face with the laser light beams L and La applied from the laser generator 3, the output of the laser light beam L is set to, for example, 200 W, and the shifting speed of the partial reflection mirror 6, the cutting blade 2 and the total reflection mirror 7 is set to, for example, 40 m/min.

Figure 14:
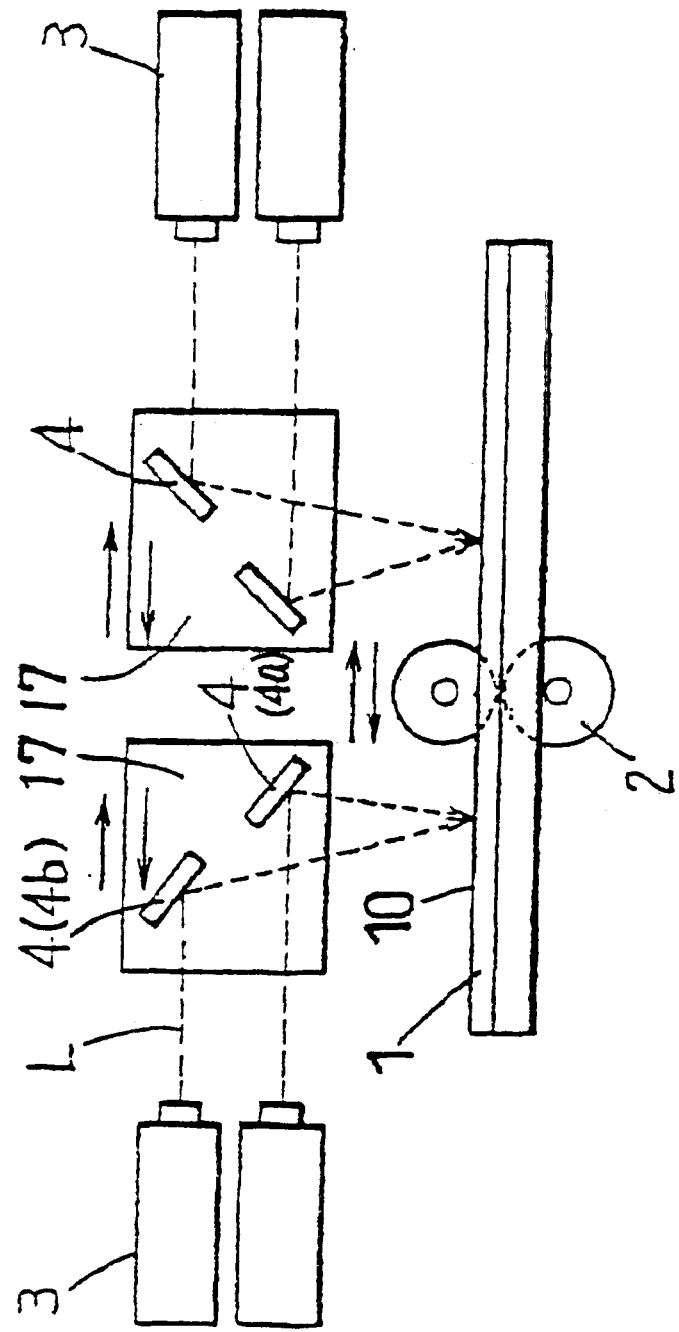
FIG. 14 is a schematic view of a cutting system in accordance with a thirteenth embodiment of the present invention.
Figure 15:
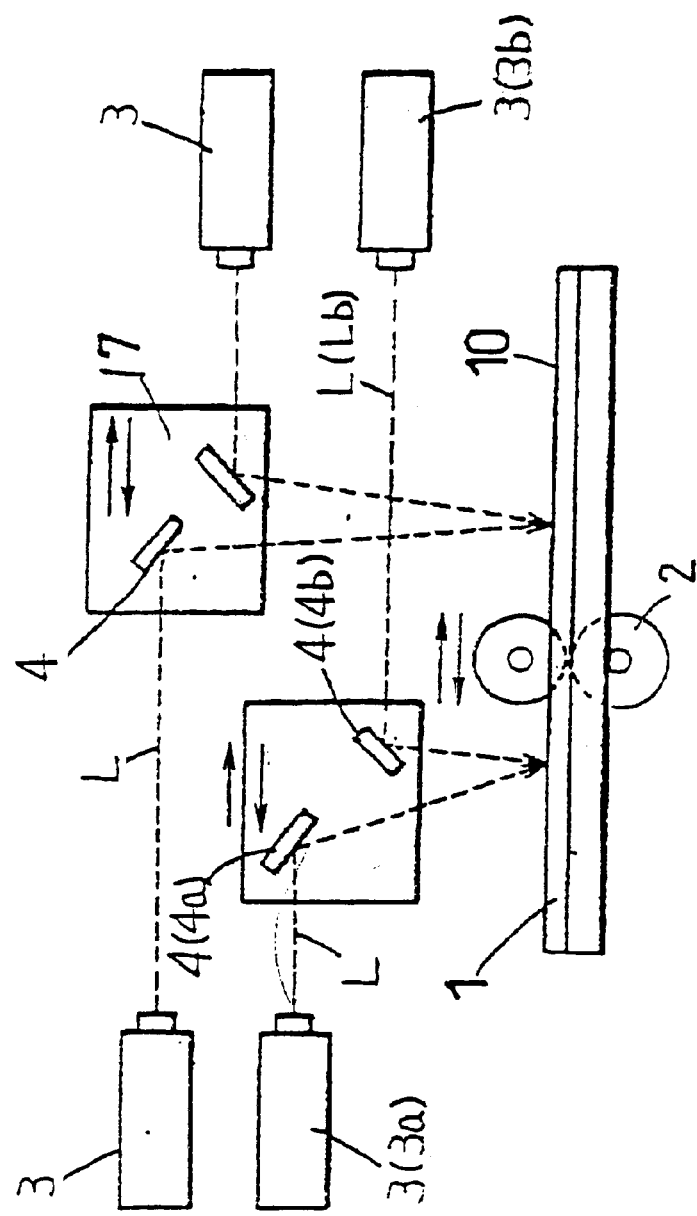
FIG. 15 is a schematic view of a cutting system in accordance with a fourteenth embodiment of the present invention.

FIGS. 14 and 15 are schematic drawings that shows a cutting device of prepreg that is an example of another preferred embodiment of a method in accordance with the present invention. The following description will explain only features different from those in FIGS. 12 and 13. The cutting device shown in FIG. 14 is provided with a plurality of laser generators 3 placed at positions forward and rear of the cutting blade 2. The cutting device is provided with a plurality of reflection mirrors 4 that totally reflect laser light beams L emitted from the laser generators 3 downward, and that are placed on the light path of the laser lights L above the prepreg 1. A mirror box 17 houses the reflection mirrors 4. The reflection mirrors 4a and 4b housed in the mirror box 17 are designed to have freely adjustable angles with respect to the light paths of the laser light beams L. The angles of the reflection mirrors 4a and 4b are set so that the laser light beams L reflected by the reflection mirrors 4a and 4b are converged at a predetermined position of the prepreg 1. The mirror boxes 17 are placed at positions forward and to the rear in the advancing direction of the cutting blade 2. The reflection mirrors 4, housed in a housing body 17 placed at the position forward in the advancing direction, direct the laser light beam to a position forward, in the advancing direction, of the cutting blade 2, and the reflection mirrors 4 housed in the mirror box 17, placed at the rear position in the advancing direction, direct the laser light beam to a position rear, in the advancing direction, of the cutting blade 2.

In a cutting method of the prepreg 1 using the cutting device shown in FIG. 14, a laser light beam L is emitted from a plurality of laser generators 3. The laser light beam L reflected by the reflection mirrors 4 placed at the position forward, in the advancing direction, of the cutting blade 2 is converged onto the surface 10 of the prepreg 1 so that the resin of the prepreg 1 at the portion is softened. The cutting blade 2 cuts the softened portion. Moreover, the laser light beam L reflected by the reflection mirrors 4 placed at the position to the rear, in the advancing direction, of the cutting blade 2 is converged onto the cut end portion of the prepreg 1 that has been cut by the cutting blade 2 to soften and melt the resin to form a smooth end face. The cutting blade 2 and the mirror boxes 17 of the reflection mirrors 4 freely shift reversibly. Therefore, the cutting operations can be carried out on the advancing path as well as on the returning path.

The spot diameter of the laser is preferably set to 5 to 10 mm. Moreover, in order to soften the resin and melt the face cut by the laser light beams L applied from the laser generator 3, the output of the laser light beam L is set to, for example, 60 W, and the cutting blade 2 and the reflection mirrors 4 is set to move at, for example, 40 m/min.

FIG. 15 shows another preferred embodiment of the present invention. This cutting device is provided with a plurality of laser generators that are placed at front and rear positions of a cutting blade 2. One reflection mirror 4a of the reflection mirrors 4 housed in a single mirror box 17 reflects a laser light beam La from the laser generator 3a placed at the position forward of the cutting blade 2, and the other reflection mirror 4b reflects the laser light beam Lb from the laser generator 3d placed to the rear of the cutting device 2.

In the method of cutting prepreg 1 using the cutting device shown in FIG. 15, laser light beams L are emitted from a plurality of laser generators 3. A plurality of laser light beams L reflected at mirror boxes 17 are directed to positions front and rear of the cutting blade 2, respectively, in the advancing direction. The laser light beam L applied to the position forward of the cutting blade 2 is converged onto the surface 10 of the prepreg 1 so that the resin of the prepreg 1 at this light-converged portion is softened. The cutting blade 2 cuts the softened portion. Moreover, the laser light beam L applied to the position to the rear of the cutting blade 2 in the advancing direction is converged onto the cut portion of the prepreg 1 to soften and melt the resin, thereby forming a smooth end face. The cutting blade 2 and the mirror boxes 17 of the reflection mirrors 4 freely shift reversibly so that the cutting operations are carried out in the advancing path and the returning path of the cutting blade 2.

The spot diameter of the laser is preferably set to 5 to 10 mm. Moreover, in order to soften the resin and melt the face cut by the laser light beams L applied from the laser generator 3, the output of the laser light beam L is set to, for example, 60 W, and the cutting blade 2 and the reflection mirrors 4 is set to move at, for example, 40 m/min. Of course, the output of the laser light beam L and the speed of the cutting blade and the reflection mirrors may be used. Moreover, if the control apparatus of FIG. 11 is used in combination with the present embodiment, the speed may be varied with readings of a heat sensor at the surface of the prepreg. Accordingly, features of the present embodiment, as well as the other embodiments described herein, are not limited to an embodiment in which they are described.

It is noted that the foregoing examples have been provided merely for the purpose of explanation and are in no way to be construed as limiting of the present invention. Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects.

Furthermore, features shown in particular embodiments may be used in combination with other embodiments where they are not specifically described.

For example, the flexible optical fiber shown in FIG. 5 may be used with any of the other embodiments as a medium to transmit a laser light beam. Additionally, the temperature feed-back from temperature sensors shown in FIG. 11 may be used with any other embodiment to provide consistency in the heating operation of an embodiment.

Furthermore, although the invention has been described with reference to particular means, materials and embodiments, the invention is not intended to be limited to the particulars disclosed; rather, the invention extends to all functionally equivalent structures, methods and uses such as are within the scope of the appended claims.

This application is based on the Japanese Patent Application No. 2001-392113, filed on Dec. 25, 2001, the entire content of which is expressly incorporated by reference herein.

What is claimed is:

1. A method of cutting prepreg, which cuts a prepreg that has been formed by impregnating a base member with a resin and semi-cured into a predetermined size, comprising:
    directing a laser light beam onto a surface of said prepreg to soften the resin of the portion irradiated by the laser light beam, and
    cutting the softened portion of the resin with a cutting blade.

2. The method of cutting prepreg according to claim 1, wherein:
    the laser beam is directed to the prepreg with an irradiation position being fixed with respect to said cutting blade such that the prepreg resin of the portion irradiated with the laser beam is heated and softened and the softened portion of the prepreg is cut by said cutting blade as the prepreg is transferred, and said cutting blade is placed at a position forward of the irradiation position in the feeding direction of the prepreg.

3. The method of cutting prepreg according to claim 1, wherein the irradiation position of the laser light beam is shifted when irradiating the surface of said prepreg with the laser light beam.

4. The method of cutting prepreg according to claim 1, comprising further irradiating the cut end portion of the prepreg with a laser light beam.

5. The method of cutting prepreg according to claim 1, wherein an irradiation position of a laser light beam is fixed with respect to the cutting blade on the portion of the prepreg cut by the cutting blade as the prepreg is transferred.

6. The method of cutting prepreg according to claim 1, wherein a carbon oxide gas laser is used as the laser light beam.

7. The method of cutting prepreg according to claim 1, wherein the cutting blade comprises upper and lower rotary blades with the lower rotary blade being driven to rotate.

8. The method of cutting prepreg according to claim 1, wherein a reflection mirror is placed on a light path of a laser light beam emitted from a laser oscillator such that a laser light beam is reflected by the reflection mirror to a predetermined irradiation position of the prepreg.

9. The method of cutting prepreg according to claim 8, wherein a light-converging lens is placed on an outlet for outputting the reflected laser light beam of the reflection mirror such that the laser light beam that passes through the light-converging lens is directed onto the prepreg.

10. The method of cutting prepreg according to claim 1, wherein reflection mirrors are placed at positions forward and to the rear of the cutting blade along the light path of the laser light beam from the laser oscillator, with the reflection mirror on the side closer to the laser oscillator being allowed to shift between a position on the light path of the laser light beam and a position out of the light path.

11. The method of cutting prepreg according to claim 1, further comprising:
    positioning a partial reflection mirror that transmits one portion of the laser light beam incident thereon and that reflects the other portion to the prepreg and a total reflection mirror that reflects the laser light beam that has passed through the partial reflection mirror to the surface of the prepreg on the light path of said laser light, and,
    of the laser light beam reflected by the partial reflection mirror and the laser light beam reflected by the total reflection mirror, directing one of the laser light beams to the prepreg at a position forward of the cutting blade in the advancing direction of the cutting blade and directing the other to the cut end that has been cut by the cutting blade.

12. The method of cutting prepreg according to claim 11, wherein said partial reflection mirror and at least one of the total reflection mirror and the cutting blade are integrally and movably formed into a single unit.

13. The method of cutting prepreg according to claim 11, wherein:
    a partial reflection mirror that reflects one portion of the laser light beam and transmits the other portion and a total reflection mirror that totally reflects the laser light beam that has passed through the partial reflection mirror are placed on the light path of the laser light beam from the laser oscillator, and wherein,
    of the laser light beam reflected by the partial reflection mirror and the laser light beam reflected by the total reflection mirror, one is reflected to a position to the rear of the cutting blade in the prepreg feeding direction, and the other is directed to the cut portion at a position forward of the cutting blade in the prepreg feeding direction.

14. The method of cutting prepreg according to claim 1, wherein a plurality of laser light beams emitted from a plurality of laser oscillators are converged and directed to the prepreg.

15. The method of cutting prepreg according to claim 1, wherein the laser light beam directed to the prepreg has a focal point offset from the surface of the prepreg.

16. The method of cutting prepreg according to claim 1, wherein the laser light beam emitted from the laser oscillator passes through an optical fiber and is directed to a predetermined irradiation position of the prepreg.

17. The method of cutting prepreg according to claim 1, wherein:

the temperature of the prepreg at the irradiation position of the laser light is detected and, based upon the detected temperature, at least one of an output of the laser light beam from the laser oscillator and a transporting speed of the prepreg is adjusted.

18. The method of cutting prepreg according to claim 1, further comprising:

positioning a partial reflection mirror that reflects one portion of the laser beam and transmits the other portion thereof and a total reflection mirror that totally reflects the laser light beam that passes through the partial reflection mirror on a light path of the laser light beam from the laser oscillator in a width direction orthogonal to the feeding direction of the prepreg, such that the laser light beam reflected by the partial reflection mirror and the laser light beam reflected by the total reflection mirror are respectively directed to the prepreg.

19. The method of cutting prepreg according to claim 18, wherein a plurality of partial reflection mirrors are placed on the light path of the laser light beam, and at least one partial reflection mirrors are allowed to shift between a position on the light path of the laser light beam and a position out of the light path, such that the laser light beams reflected by the partial reflection mirrors positioned on the light path of the laser light beam are directed to the prepreg.

20. The method of cutting prepreg according to claim 1, further comprising:

placing a plurality of partial reflection mirrors on the light path of the laser light beam and placing a shutter on an outlet through which each of the reflected laser lights of the partial reflection mirrors is output from the respective partial reflection mirrors, such that laser light beams from the partial reflection mirrors are directed to the prepreg when the shutters are open.

21. A prepreg cutting apparatus, that cuts prepreg formed by impregnating a base member with a resin and semi-curing the impregnated base member, comprising:

a laser light source that emits a laser light beam that is directed onto a surface of the prepreg to soften the resin of the portion irradiated by the laser light beam, and a cutting instrument that cuts the softened portion of the resin with a cutting blade.

22. The prepreg cutting apparatus of claim 21, further comprising a first reflection mirror that reflects the laser light beam to a first portion of the prepreg, the laser beam thereby heating the resin of the prepreg.

23. The prepreg cutting apparatus of claim 22, further comprising a partial reflection mirror that reflects a first portion of the laser beam from the laser light source to a second portion of the prepreg and that transmits a second portion of the laser beam to the first reflection mirror.

24. The prepreg cutting apparatus of claim 22, further comprising a light-converging lens that converges the reflected laser light beam from the first reflection mirror.

25. The prepreg apparatus of claim 23, wherein the cutting blade, the first reflection mirror and the second partial reflection mirror are integrally and movably formed as a single unit.

\* \* \* \* \*

UNITED STATES PATENT AND TRADEMARK OFFICE
CERTIFICATE OF CORRECTION

PATENT NO.    : 6,621,046 B2
DATED         : September 16, 2003
INVENTOR(S)   : Y. Kaji It is certified that error appears in the above-identified patent and that said Letters Patent is hereby corrected as shown below:

<u>Column 20,</u>
Line 58, "claim 11" should be -- claim 1 --.

Signed and Sealed this

First Day of June, 2004

JON W. DUDAS
*Acting Director of the United States Patent and Trademark Office*